US008734246B2

(12) United States Patent
Iwakiri et al.

(10) Patent No.: US 8,734,246 B2
(45) Date of Patent: May 27, 2014

(54) INFORMATION STORAGE MEDIUM, SYNCHRONIZATION CONTROL METHOD, AND COMPUTER TERMINAL

(75) Inventors: Hidenori Iwakiri, Tokyo (JP); Tetsuo Hannya, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 1341 days.

(21) Appl. No.: 12/509,143

(22) Filed: Jul. 24, 2009

(65) Prior Publication Data

US 2010/0022302 A1    Jan. 28, 2010

(30) Foreign Application Priority Data

Jul. 28, 2008   (JP) .................................. 2008-194209

(51) Int. Cl.
*A63F 13/00*    (2006.01)

(52) U.S. Cl.
USPC ........................................................... 463/30

(58) Field of Classification Search
USPC ........................... 463/30–32, 42, 43; 709/236
See application file for complete search history.

(56) References Cited

U.S. PATENT DOCUMENTS

| 7,188,213 | B2 * | 3/2007  | Kaneda et al. ................. 711/117 |
| 7,431,651 | B2   | 10/2008 | Yamana et al. |
| 8,043,161 | B2   | 10/2011 | Nogami et al. |
| 8,045,844 | B2 * | 10/2011 | Sasaki et al. ................... 386/341 |
| 2002/0077179 | A1 | 6/2002 | Sengoku |
| 2004/0087371 | A1 | 5/2004 | Yamana et al. |
| 2010/0022302 | A1 * | 1/2010 | Iwakiri et al. ................... 463/30 |
| 2013/0070928 | A1 * | 3/2013 | Ellis et al. ....................... 381/56 |

FOREIGN PATENT DOCUMENTS

| JP | A-11-347254   | 12/1999 |
| JP | A-2001-17735  | 1/2001  |
| JP | A-2001-198363 | 7/2001  |
| JP | A-2002-186785 | 7/2002  |
| JP | A-2003-071137 | 3/2003  |
| JP | A-2004-049922 | 2/2004  |
| JP | A-2005-6913   | 1/2005  |
| JP | A-2006-32502  | 2/2006  |
| JP | A-2006-280473 | 10/2006 |
| JP | A-2008-125678 | 6/2008  |
| JP | A-2009-312    | 1/2009  |
| JP | A-2009-313    | 1/2009  |

\* cited by examiner

OTHER PUBLICATIONS

Yoshihiko Uto et al., U.S. Appl. No. 12/501,789, filed Jul. 13, 2009.

*Primary Examiner* — Ronald Laneau
(74) *Attorney, Agent, or Firm* — Oliff PLC

(57) ABSTRACT

A computer terminal includes a first data generation section that generates first data associated with an identification number corresponding to each frame, a data communication control section that transmits and receives data, a synchronization control section that stores the first data in a first storage area and stores second data in a second storage area based on the identification number, and extracts the first data stored in the first storage area and the second data stored in the second storage area in synchronization based on the identification number, a calculation section that performs calculations every frame based on the first data extracted from the first storage area and the second data extracted from the second storage area, a communication delay time determination section that performs a test communication and determines a communication delay time based on the result of the test communication, and an input delay time setting section that sets an input delay time and transmits the input delay time to another computer terminal, the input delay time being equal to or longer than the communication delay time. The synchronization control section extracts data having an elapsed time after input of the data that has exceeded the input delay time based on the identification number and the input delay time.

24 Claims, 14 Drawing Sheets

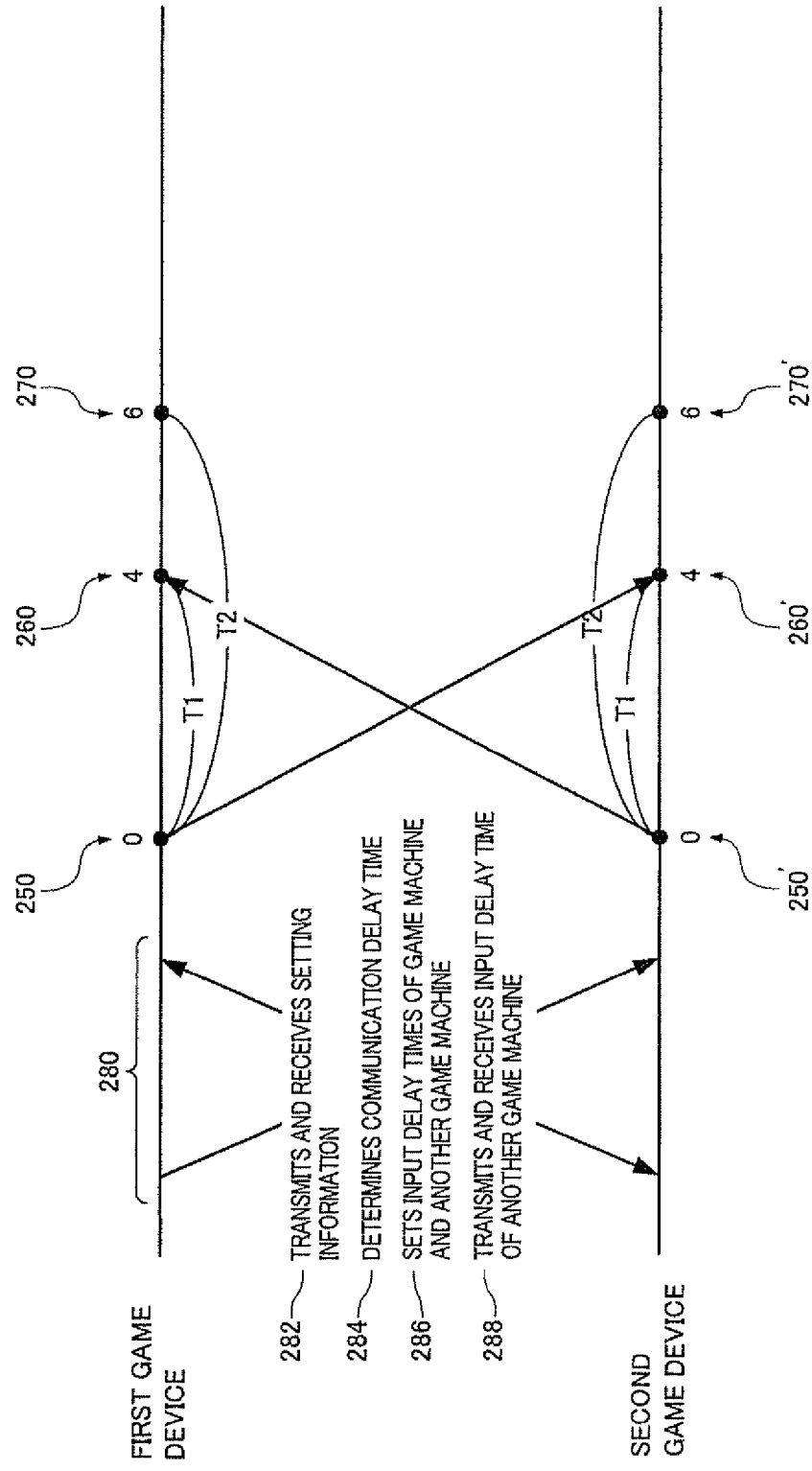

FIG. 15

| COMMUNICATION DELAY TIME | INPUT DELAY TIME |
|---|---|
| 1~3 | 6 |
| 4~6 | 8 |
|  |  |
|  | 30 |

INFORMATION STORAGE MEDIUM, SYNCHRONIZATION CONTROL METHOD, AND COMPUTER TERMINAL

Japanese Patent Application No. 2008-194209, filed on Jul. 28, 2008, is hereby incorporated by reference in its entirety.

BACKGROUND OF THE INVENTION

The present invention relates to an information storage medium, a synchronization control method and a computer terminal.

An online game that allows a plurality of players to participate in and play a game through a network has been known. In such an online game, a game device exchanges data with another game device through a network, and proceeds with the game in synchronization with the other game device. For example, JP-A-2001-17735, JP-A-2002-186785, and JP-A-2005-6913 disclose technology that proceeds with a game while achieving synchronization between game devices.

Since a communication delay occurs when exchanging data through a network, it is necessary to reflect the operation input of the player in the game while taking account of the communication delay. However, since the communication environment of the player who participates in the online game varies according to time and circumstances, a long period of time may be required until the operation input of the player is reflected in the game, if the operation input of the player is reflected in the game on the assumption that the communication delay is constant. In particular, when implementing a game in which the operation input timing of the player is important (e.g., fighting game), the player cannot fully enjoy the game if the response to the operation input of the player is delayed.

JP-A-2006-32502 discloses a method that implements a quick-response game by predicting the movement of another player's character operated by another player based on the communication delay time of data received from another game device so that the player's character and the other player's character maintain consistency. However, a method that predicts the movement of another character is not suitable for a game in which the operation timing is important (e.g., fighting game). For example, when executing a fighting game, game calculations are sequentially performed when input information has been input by each player so that each character makes a motion. Therefore, it is difficult to employ a method that predicts the motion of each character.

SUMMARY

According to a first aspect of the invention, there is provided a computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

According to a second aspect of the invention, there is provided a computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area; and an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control section extracting data having an elapsed time after input of the data that has exceeded the input delay time, based on the first input delay time and the identification numbers associated with the first data stored in the first storage area and the second data stored in the second storage area.

According to a third aspect of the invention, there is provided a synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area;

a communication delay time determination step that performs a test communication between the computer terminal and the other computer terminal, and determines a communication delay time based on the result of the test communication; and an input delay time setting step that sets an input delay time and transmits the input delay time to the other computer terminal through the network, the input delay time being equal to or longer than the determined communication delay time, the synchronization control step extracting data having an elapsed time after input of the data that has exceeded the input delay time, based on the input delay time and the identification numbers associated with the first data stored in the first storage area and the second data stored in the second storage area.

According to a fourth aspect of the invention, there is provided a synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area; and an input delay time setting step that calculates a difference in display delay time between the computer terminal and the other computer terminal based on display delay time information about the computer terminal and the other computer terminal, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control step extracting data having an elapsed time after input of the data that has exceeded the input delay time, based on the first input delay time and the identification numbers associated with the first data stored in the first storage area and the second data stored in the second storage area.

According to a fifth aspect of the invention, there is provided a computer terminal that transmits data to or receives data from another computer terminal through a network and performs calculations based on data input from an operation section and data received from the other computer terminal through the network, the computer terminal comprising:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

According to a sixth aspect of the invention, there is provided a computer terminal that transmits data to or receives data from another computer terminal through a network and performs calculations based on data input from an operation section and data received from the other computer terminal through the network, the computer terminal comprising:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area; and an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control section extracting data having an elapsed time after input of the data that has exceeded the input delay time, based on the first input delay time and the identification numbers associated with the first data stored in the first storage area and the second data stored in the second storage area.

BRIEF DESCRIPTION OF THE SEVERAL VIEWS OF THE DRAWING

FIG. 11 is a diagram illustrating an example of a timing chart of an input delay setting process.

FIG. 15 is a diagram illustrating an example of setting an input delay time based on a communication delay time.

DETAILED DESCRIPTION OF THE EMBODIMENT

Figure 1:
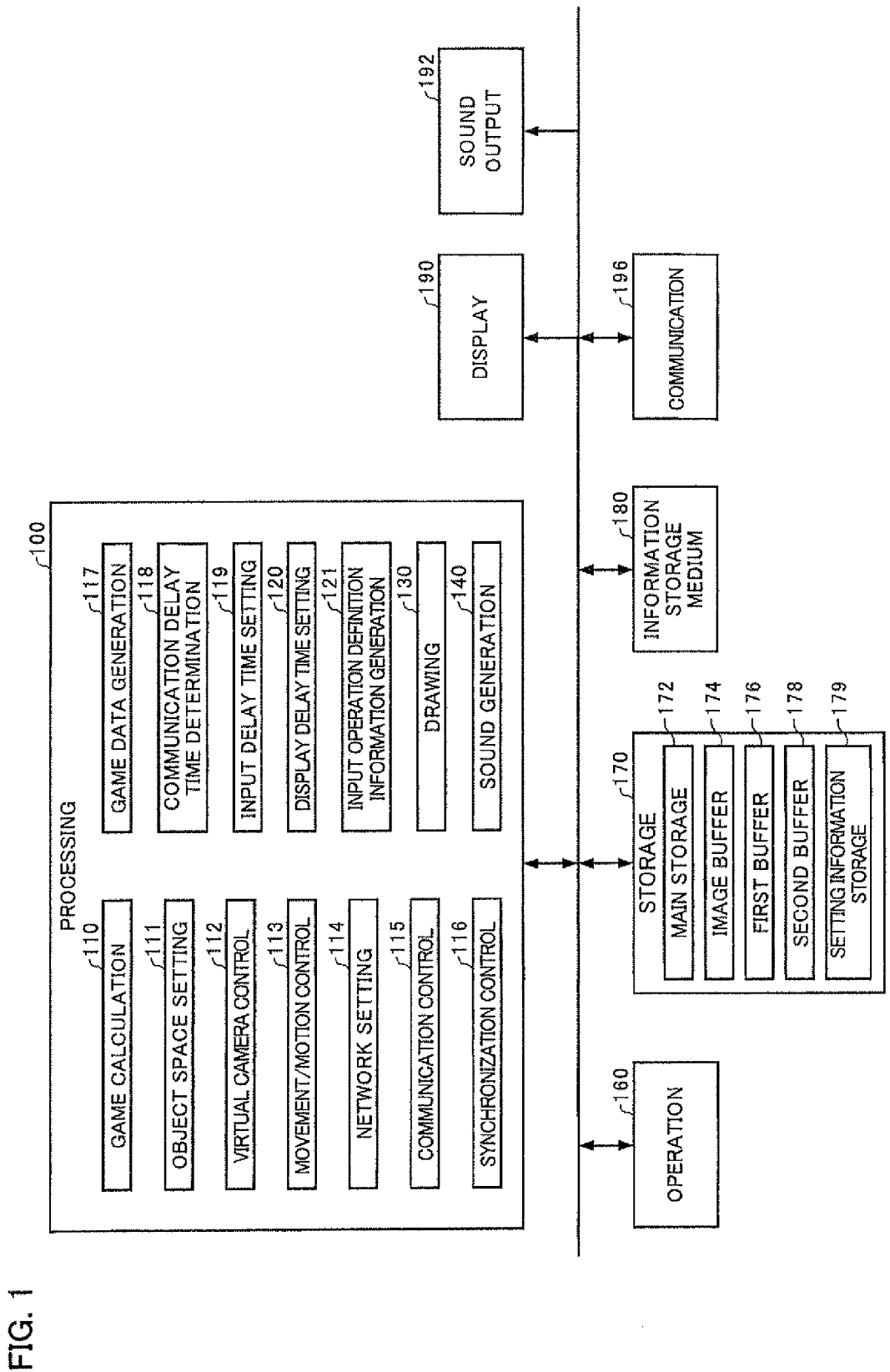
FIG. 1 is a functional block diagram of a game device according to one embodiment of the invention.

The invention may provide an information storage medium, a synchronization control method and a computer terminal that can implement a network process that can efficiently reflect the operation of the player by appropriately setting a delay depending on the communication environment.

The invention may also provide an information storage medium, a synchronization control method and a computer terminal that can implement a network process that achieves display synchronization by setting an optimum delay depending on the display environment.

(1) According to one embodiment of the invention, there is provided a computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

The term "communication delay time" refers to the time required for communication between the computer terminals (i.e., the time that indicates the number of frames elapsed until the data that has been transmitted from the computer terminal is received by the other computer terminal or the number of frames elapsed until the computer terminal receives the data transmitted from the other computer terminal), and may be indicated by the number of frames.

The term "input delay time" refers to the time that indicates the number of frames between the time when the player has performed an operation input and the time when the computer terminal performs calculations based on the operation input.

The synchronization control section may sequentially extract data having an elapsed time after input of the data that has exceeded the input delay time in the order from the oldest data by sequentially extracting data for which the number of frames after the input information corresponding to the data has been input has reached the input delay time.

The first storage area is a storage area in which the first data input from the operation section is stored, and the second storage area is a storage area in which the second data received from the other computer terminal is stored. For example, the first storage area and the second storage area may be provided in a main storage section and read/write-controlled by means of software.

The above embodiment can implement a network process that can efficiently reflect the operation of the player by appropriately setting a delay depending on the communication environment.

(2) In the above embodiment, the first data generation section may generate the first data associated with the identification number corresponding to a scheduled calculation frame that reflects the input delay time, based on the input delay time and a frame in which the input information from the operation section has been received; and the synchronization control section may extract data for which the scheduled calculation frame has been reached based on the identification number.

The first data generation section may generate a frame number obtained by adding the input delay time (i.e., the number of frames) of the computer terminal to the frame number when the input information corresponding to the first data has been input, generate the identification number corresponding to the generated frame number, and associate the identification number with the data.

(3) In the above embodiment, the input delay time setting section may determine a difference in display delay time between the computer terminal and the other computer terminal based on display delay time information, set a first input delay time and a second input delay time so that the input delay time of one of the computer terminal and the other computer terminal having a shorter display delay time is longer than the input delay time of the other of the computer terminal and the other computer terminal by the difference in display delay time, and transmit second input delay time information to the other computer terminal through the network.

(4) According to one embodiment of the invention, there is provided a computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area; and an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control section extracting data having an elapsed time after input of the data that has exceeded the input delay time, based on the first input delay time and the identification numbers associated with the first data stored in the first storage area and the second data stored in the second storage area.

The first input delay time and the second input delay time may be set to be longer than a predetermined communication delay time.

The above embodiment can implement a network process that achieves display synchronization by setting an optimum delay depending on the display environment, (5) In the above embodiments, the first data generation section may generate the first data associated with the identification number corresponding to a scheduled calculation frame that reflects the first input delay time, based on the first input delay time and a frame in which the input information from the operation section has been received;

the first data generation section may generate transmission data to be transmitted to the other computer terminal based on the second input delay time and a frame in which the input information from the operation section has been received, the transmission data being associated with the identification number corresponding to a scheduled calculation frame that reflects the second input delay time;

the data communication control section may transmit the generated transmission data to the other computer terminal through the network at predetermined intervals, and receive the second data transmitted from the other computer terminal through the network; and the synchronization control section may store the first data in the first storage area based on the identification number associated with the first data, and store the second data in the second storage area based on the identification number associated with the second data.

(6) In the above embodiments, the program may cause the computer to further function as:

a display delay time setting section that sets first display delay time information based on the input information from the operation section; and a display delay time information communication control section that transmits the set first display delay time information to the other computer terminal through the network, and receives second display delay time information about the other computer terminal transmitted from the other computer terminal through the network, wherein the input delay time setting section calculates the difference in display delay time between the computer terminal and the other computer terminal based on the set first display delay time information and the received second display delay time information.

(7) In the above embodiments, the communication delay time determination section may sequentially perform the test communication that transmits and receives a packet between the computer terminal and the other computer terminal a plurality of times, and determine the communication delay time based on the results of the test communication.

(8) In the above embodiments, the communication delay time determination section may determine the communication delay time based on a test communication state within a predetermined period after starting the test communication.

(9) In the above embodiments, the program may cause the computer to further function as:

an input operation definition information generation section that receives a setting input that sets the relationship between an input operation from the operation section and movement information used in common in the computer terminal and the other computer terminal, and generates input operation definition information that defines the relationship between the input operation from the operation section and the movement information based on the setting input, wherein the first data generation section converts information indicated by the input operation corresponding to the input information into the movement information based on the input operation definition information, and generates data that includes the movement information.

(10) In the above embodiments, the program may cause the computer to further function as:

an input operation definition information generation section that receives a setting input that sets the relationship between an input operation from the operation section and movement information used in common in the computer terminal and the other computer terminal, and generates first input operation definition information that defines the relationship between the input operation from the operation section and the movement information based on the setting input; and an input operation definition information communication control section that transmits the generated first input operation definition information to the other computer terminal through the network, and receives second input operation definition information transmitted from the other computer terminal through the network, wherein the first data generation section generates the first data that includes information indicated by the input operation from the operation section corresponding to the input information;

wherein the calculation section converts the information indicated by the input operation included in the first data extracted from the first storage area into first movement information, based on the first input operation definition information;

wherein the calculation section converts the information indicated by the input operation included in the second data extracted from the second storage area into second movement information based on the second input operation definition information; and wherein the calculation section performs calculations every frame based on the first movement information and the second movement information.

(11) In the above embodiments, the game calculation section may stop calculations and display the same image as an image in a preceding frame when the second data to be extracted has not been received from the other computer terminal.

(12) In the above embodiments, the data communication control section may transmit data to the other computer terminal according to a first protocol whereby data that has been lost during transmission is not retransmitted, and receive the second data transmitted from the other computer terminal according to the first protocol;

the data communication control section may transmit a data retransmission request while adding the identification number associated with the second data to be extracted as retransmission data identification information when the second data to be extracted has not been received; and the data communication control section may transmit data associated with the identification number corresponding to the added retransmission data identification information to the other computer terminal when the data retransmission request has been received from the other computer terminal.

(13) In the above embodiments, the data communication control section may transmit n packets to the other computer terminal according to a first protocol whereby data that has been lost during transmission is not retransmitted, transmit a packet including data in the n packets to the other computer terminal according to a second protocol whereby data that has been lost during transmission is retransmitted each time the n packets is transmitted according to the first protocol, and receive packets transmitted from the other computer terminal according to the first protocol and the second protocol; and when a packet corresponding to data in a given frame has not been received from the other computer terminal according to the first protocol, the synchronization control section may store the data in the given frame included in a packet transmitted from the other computer terminal according to the second protocol in the second storage area.

(14) According to one embodiment of the invention, there is provided a synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area;

a communication delay time determination step that performs a test communication between the computer terminal and the other computer terminal, and determines a communication delay time based on the result of the test communication; and an input delay time setting step that sets an input delay time and transmits the input delay time to the other computer terminal through the network, the input delay time being equal to or longer than the determined communication delay time, the synchronization control step extracting data having an elapsed time after input of the data that has exceeded the input delay time, based on the input delay time and the identification numbers associated with the first data stored in the first storage area and the second data stored in the second storage area.

(15) According to one embodiment of the invention, there is provided a synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area; and an input delay time setting step that calculates a difference in display delay time between the computer terminal and the other computer terminal based on display delay time information about the computer terminal and the other computer terminal, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control step extracting data having an elapsed time after input of the data that has exceeded the input delay time, based on the first input delay time and the identification numbers associated with the first data stored in the first storage area and the second data stored in the second storage area.

(16) According to one embodiment of the invention, there is provided a computer terminal that transmits data to or receives data from another computer terminal through a network and performs calculations based on data input from an operation section and data received from the other computer terminal through the network, the computer terminal comprising:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

(17) According to one embodiment of the invention, there is provided a computer terminal that transmits data to or receives data from another computer terminal through a network and performs calculations based on data input from an operation section and data received from the other computer terminal through the network, the computer terminal comprising:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area; and an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control section extracting data having an elapsed time after input of the data that has exceeded the input delay time, based on the first input delay time and the identification numbers associated with the first data stored in the first storage area and the second data stored in the second storage area.

1. Configuration

FIG. 1 is a functional block diagram illustrating a game device according to one embodiment of the invention. Note that the game device according to this embodiment may have a configuration in which some of the elements in FIG. 1 are omitted.

An operation section 160 allows the player to input operation information for operating a player's character (including a player's character, a moving object, a player's object, and a game character operated by the player). The function of the operation section 160 may be implemented by a lever, a button, a steering wheel, a microphone, a touch panel display, a casing, or the like.

A storage section 170 serves as a work area for a processing section 100, a communication section 196, and the like. The function of the storage section 170 may be implemented by a RAM (VRAM) or the like. The storage section 170 according to this embodiment includes a main storage section 172, an image buffer 174, a first buffer 176, a second buffer 178, and a control information storage section 179.

The first buffer 176 stores game data generated based on input information input to the game device. The second buffer 178 stores game data received from another game device.

The first buffer is a storage area in which the game data of the game device is stored, and the second buffer is a storage area in which the game data received from another game device is stored. For example, the first buffer and the second buffer may be provided in the main storage section, and may be read/write-controlled by means of software.

The control information storage section 179 optionally stores an input delay time of the game device or another game device, input operation definition information about the game device or another game device, or display delay information about the game device or another game device.

An information storage medium 180 (computer-readable medium) stores a program, data, and the like. The function of the information storage medium 180 may be implemented by all optical disk (CD or DVD), a magneto-optical disk (MO), a magnetic disk, a hard disk, a magnetic tape, a memory (ROM), a memory card, or the like. The processing section 100 performs various processes according to this embodiment based on a program (data) stored in the information storage medium 180. Specifically, a program that causes a computer to function as each section according to this embodiment (i.e., a program that causes a computer to execute the process of each section) is stored in the information storage medium 180.

A display section 190 outputs an image generated according to this embodiment. The function of the display section 190 may be implemented by a CRT, an LCD, a touch panel display, a head mount display (HMD), or the like. A sound output section 192 outputs sound generated according to this embodiment. The function of the sound output section 192 may be implemented by a speaker, a headphone, or the like.

The communication section 196 performs various types of control for communicating with the outside (e.g., another game device, a server, or another game system). The function of the communication section 196 may be implemented by hardware such as a processor or a communication ASIC, a program, or the like.

Note that the game device may download a program (data) that causes a computer to function as each section according to this embodiment from a server through a network, and may store the program (data) in the information storage medium 180. Use of the program stored in the server is also included within the scope of the invention.

The processing section 100 (processor) performs a game calculation process, an image generation process, a sound generation process, and the like based on operation information (i.e., input information) from the operation section 160, a program, and the like. The processing section 100 performs various processes using the main storage section 172 of the storage section 170 as a work area. The function of the processing section 100 may be implemented by hardware such as a processor (e.g., CPU or DSP) or an ASIC (e.g., gate array), or a program.

The processing section 100 includes a game calculation section 110, an object space setting section 111, a virtual camera control section 112, a movement/motion processing section 113, a network setting section 114, a communication control section 115, a synchronization control section 116, a game data generation section 117, a communication delay time determination section 118, an input delay time setting section 119, a display delay time setting section 120, an input operation definition information generation section 121, a drawing section 130, and a sound generation section 140. The processing section 100 may have a configuration in which some of these sections are omitted.

The game calculation section 110 starts the game when game start conditions have been satisfied, proceeds with the game, disposes an object such as a character or a map, displays an object, calculates the game result, and finishes the game when game finish conditions have been satisfied, for example.

The game calculation section 110 according to this embodiment may set the strength value of each player's character at the initial value (e.g., 100) when the game starts, may perform a hit determination process every frame based on input information input by each player during a game period (e.g., 90 seconds) (during the game), may reduce the strength value of each player's character based on the hit determination result, and may determine the game result (victory, defeat, or draw) based on whether or not the strength value of each player's character has reached zero. When the strength value of each player's character is larger than zero when the game period has elapsed, the game calculation section 110 may determine that the player's character having a strength value larger than that of the other player has won the game. When the player's characters have an identical strength value, the game calculation section 110 may determine that the game has ended in a draw.

The game calculation section 110 according to this embodiment performs game calculations every frame based on the game data extracted from the first buffer 176 and the game data extracted from the second buffer 178.

The game calculation section 110 according to this embodiment may perform game calculations that cause a first player's character operated by the player who uses the game device and a second player's character operated by the player who uses another game device to make motions based on the game data extracted from the first buffer 176 and the game data extracted from the second buffer 178.

The object space setting section 111 disposes an object (i.e., an object formed by a primitive such as a polygon, a free-form surface, or a subdivision surface) that represents a display object (e.g., player's character, moving object, building, stadium, car, tree, pillar, wall, or map (topography) in an object space. Specifically, the object space setting section 111 determines the position and the rotational angle (synonymous with orientation or direction) of the object in a world coordinate system, and disposes the object at the determined position (X, Y, Z) and the determined rotational angle (rotational angles around X, Y, and Z-axes).

The virtual camera control section 112 controls a virtual camera for generating an image viewed from a given (arbitrary) virtual camera (viewpoint) in the object space. Specifically, the virtual camera control section 112 controls the position (X, Y, Z) or the rotational angle (rotational angles around X, Y, and Z-axes) of the virtual camera (i.e., controls the viewpoint position, the line-of-sight direction, or the angle of view). The virtual camera control section 112 may control the angle of view.

For example, when photographing an object (e.g., player's character, ball, or car) from behind using the virtual camera, the virtual camera control section 112 controls the position or the rotational angle (direction) of the virtual camera so that the virtual camera follows a change in position or rotation of the object. In this case, the virtual camera control section 112 may control the virtual camera based on information such as the position, the rotational angle, or the speed of the object obtained by the movement/motion processing section. Alternatively, the virtual camera control section 112 may rotate the virtual camera by a predetermined rotational angle, or may move the virtual camera along a predetermined path. In this case, the virtual camera control section 112 controls the virtual camera based on virtual camera data that specifies the position (moving path) or the rotational angle of the virtual camera. When a plurality of virtual cameras (viewpoints) are provided, the above-described control process is performed for each virtual camera.

The movement/motion processing section 113 calculates the movement/motion (movement/motion simulation) of a model (e.g., character, car, train, or airplane). Specifically, the movement/motion processing section 113 causes the model to move in the object space or causes the object to make a motion (animation) based on operation data input by the player using the operation section 160, a program (movement/motion algorithm), various types of data (motion data), and the like. Specifically, the movement/motion processing section 113 performs a simulation process that sequentially calculates movement information (position, rotational angle, speed, or acceleration) and motion information (i.e., the position or the rotational angle of each part that forms the object) of the object every frame (1/60th of a second). Note that the term "frame" refers to a time unit when performing an object movement/motion process (simulation process) or an image generation process.

The movement/motion processing section 113 according to this embodiment causes the player's character operated by the player to move or make a motion based on input information input by the player. The movement/motion processing section 113 causes a second player's character operated by a second player who uses another game device to move or make a motion in the same object space as the first player's character operated by the player who uses the game device based on game data contained in a packet transmitted from the other game device by the communication control section 115 (described later).

The movement/motion processing section 113 according to this embodiment performs calculations for causing the first player's character operated by the player who uses the game device to make a motion based on the game data output from the first buffer 176, and performs calculations for causing the second player's character operated by the player who uses another game device to make a motion based on the game data output from the second buffer 178.

The network setting section 114 acquires and manages network information necessary for the game system. The network setting section 114 according to this embodiment acquires and manages game device identification information given to each game device (i.e., data given to identify each game device that can participate in an online game) and packet destination information associated with the game device identification information.

The destination information may be the IP address or the port number of each game device that forms the game system. The IP address may be a global IP address that specifies a specific game device in a WAN or the Internet, or may be a private IP address that specifies a specific game device in a LAN.

The communication control section 115 generates a packet transmitted to another game device (second game device), designates the IP address or the port number of the packet destination game device, stores data contained in a received packet in the storage section 170, analyzes a received packet, and controls packet transmission/reception, for example.

The packet is a data unit transmitted through a network, and includes a header necessary for the network including a sender IP address and a destination IP address, and a payload that is data written by the sender.

When implementing an application-level communication, a packet that designates a port number that specifies the type of application according to the TCP or UDP protocol used is generated. For example, the TCP protocol ensures high data transmission/reception reliability, and utilizes an acknowledgment and retransmission, for example. The TCP protocol allows lost data retransmission, and enables a packet to be transmitted to the destination game device while maintaining the data transmission order. According to the UDP protocol, data lost during transmission is not retransmitted so that data may be transmitted in a different order. However, since the UDP protocol has no overhead, differing from the TCP protocol, the UDP protocol may be suitable for an online game that transmits data in real time. When utilizing the UDP protocol, game data is input to the buffer in the order of the identification number (ascending order). When game data having the input target identification number has not been received, the game device may request another game device to transmit the game data. This embodiment can deal with each protocol. When utilizing the UDP protocol, game data may be input to the buffer in ascending order of the identification information (or identification number).

The communication control section 115 according to this embodiment generates a packet according to the drawing frame rate, and transmits the generated packet to the second game device (connection destination). Specifically, when the frame rate is 60 fps, for example, the communication control section 115 generates a packet every 1/60th of a second, and transmits the generated packet to the second game device, the IP address and the port number of the second game device being designated as the destination IP address and the destination port number in the header of the packet, the IP address and the port number of the first game device being designated as the sender IP address and the sender port number in the header, and data including game data being contained in the payload of the packet. The game data transmitted by the communication control section 115 is input to the first buffer 176 by the synchronization control section 116 (described later) under a given condition.

The term "game data" refers to frame-unit data including the input information (including the operation information) input by the player who operates the game device. For example, the game data may indicate the presence or absence of the input information and the details of the input information when the input information is present. For example, when the game data is indicated by a numerical value, the game data may be set at "0" when the input information is absent, may be set at "1" when the input information is present and indicates that a button A has been pressed, may be set at "2" when the input information is present and indicates that a button B has been pressed, and may be set at "3" when the input information is present and indicates that the button A and the button B have been pressed.

The term "identification information" refers to data that is given every frame and is in common to a plurality of game devices (first and second game devices). In this embodiment, the identification information may be information that is given every frame depending on the time that has elapsed after connection between the first game device and the second game device has been established. For example, the identification information may be a sequential identification number (a positive integer starting from one) associated with game data acquired according to the frame rate.

When the frame rate is 60 fps, for example, the identification information is associated with game data acquired every 1/60th of a second. For example, the identification number "1" is associated with game data acquired by each of the first game device and the second game device when connection between the first game device and the second game device has been established, the identification number "2" is associated with game data acquired when 1/60th of a second has elapsed after connection between the first game device and the second game device has been established, and the identification number "3" is associated with game data acquired when 2/60th of a second has elapsed after connection between the first game device and the second game device has been established.

The communication control section 115 according to this embodiment receives a packet transmitted from the second game device. The communication control section 115 analyzes the received packet, and acquires data including game data contained in the payload of the packet. The received game data is input to the second buffer 178 by the synchronization control section 116 (described later).

The communication control section 115 according to this embodiment transmits and receives game data after connection between a plurality of game devices (connection between the first game device and the second game device) has been established until the game devices are disconnected.

Note that one of a plurality of game devices that belong to a communication group that participates in the game according to this embodiment may be designated as a host. The host may be a game device that has generated the game space. Alternatively, when the game is a match game between a winner and a challenger, the host may be a game device of the winner.

The communication control section 115 functions as a game data communication control section that transmits the generated game data to another game device through a network at predetermined intervals, and receives game data transmitted from another game device through the network.

The communication control section 115 may transmits transmission game data generated by the game device to another game device through the network at predetermined intervals, and may receive game data transmitted from another game device through a network.

The communication control section 115 also functions as a display delay time information communication control section that transmits display delay time information about the game device to another game device through a network, and receives display delay time information transmitted from another game device through the network.

The communication control section 115 may transmit input operation definition information generated by the game device to another game device through the network, and may receive input operation definition information transmitted from another game device through the network.

The synchronization control section 116 stores the game data of the game device in the first buffer based on the identification number associated with the game data of the game device, and stores the game data of another game device in the second buffer based on the identification number associated with the game data of the other game device. The synchronization control section 116 extracts the game data stored in the first buffer and the game data stored in the second buffer in synchronization based on the identification number associated with the game data. The synchronization control section 116 extracts the game data having an elapsed time after input of the data that has exceeded the input delay time based on the input delay time and the identification number associated with the game data stored in the first buffer and the second buffer.

The synchronization control section 116 controls input and output of the game data to and from the first buffer 176 and the second buffer 178. The process of inputting the game data to the buffer refers to a process of storing the game data in a storage area allocated in the buffer, and the process of outputting the game data from the buffer refers to a process of reading the game data stored in a storage area allocated in the buffer and deleting the game data from the storage area.

The synchronization control section 116 according to this embodiment inputs the game data of the game device to the first buffer 176, and inputs the game data of another game device to the second buffer 178.

The synchronization control section 116 according to this embodiment extracts the game data (sequentially from the oldest game data) for which the in-game elapsed time that has elapsed after the input information corresponding to the game data stored in the first buffer 176 and the game data stored in the second buffer 178 is input has reached the input delay time.

The synchronization control section 116 may extract the game data for which a scheduled calculation frame has been reached based on the identification number.

The synchronization control section 116 may store the game data of the game device in the first buffer based on the identification number associated with the game data of the game device, and may store the game data of another game device in the second buffer based on the identification number associated with the game data of the other game device.

When a packet corresponding to the game data in a given frame could not be received from another game device according to a first protocol, the synchronization control section 116 may store the game data in the given frame included in a packet transmitted from the other game device according to a second protocol in the second buffer.

For example, when the identification number associated with the game data corresponds to the scheduled calculation time (frame), the synchronization control section 116 may output the game data having the identification number corresponding to the scheduled calculation time (frame) from the first buffer 176 and the second buffer 178.

Specifically, the synchronization control section 116 according to this embodiment outputs the game data stored in the first buffer 176 and the game data stored in the second buffer 178 in an ascending order of the identification number on condition that the identification information associated with the game data stored in the first buffer 176 coincides with the identification information associated with the game data stored in the second buffer 178 and the identification number has reached the scheduled calculation time.

The game data generation section 117 generates the game data of the game device for each frame based on input information input to the game device, the game data being associated with the identification number corresponding to each frame.

The game data generation section 117 may generate the game data of the game device based on the input delay time and the frame in which input information has been input to the game device, the game data being associated with the identification number corresponding to the scheduled calculation frame that reflects the input delay time.

The game data generation section 117 may generate the game data of the game device based on the input delay time of the game device and the frame in which input information has been input to the game device, the game data being associated with the identification number corresponding to the scheduled calculation frame that reflects the input delay time, and may generate the transmission game data of the game device based on the input delay time of another game device and the frame in which input information has been input to the game device, the transmission game data being associated with the identification number corresponding to the scheduled calculation frame that reflects the input delay time of the other game device.

The game data generation section 117 may convert an input operation that has been performed by the game device and is indicated by the input information into the corresponding movement information, based on the input operation definition information, and may generate the game data including the movement information.

The game data generation section 117 may generate the game data including information that indicates an input operation that has been performed by the game device and is indicated by the input information.

The communication delay time determination section 118 performs a test communication between the game device and another game device, and determines the communication delay time based on the result of the test communication.

The communication delay time determination section 118 may sequentially perform a test communication that transmits and receives a packet between the game device and another game device (opposing game device) a plurality of times, and may determine the communication delay time based on the results of the test communication.

The communication delay time determination section 118 may determine the communication delay time based on the test communication state within a predetermined period after starting the test communication.

The input delay time setting section 119 sets an input delay time that is longer than the determined communication delay time, and transmits the input delay time to another game device through the network.

The input delay time setting section 119 may calculate the difference in display delay time between the game device and another game device based on display delay time information about the game device and the other game device, may set the input delay time of the game device and the input delay time of the other game device so that the input delay time of one of the game device and the other game device having a shorter display delay is longer than that of the other by the difference in display delay time, and may transmit the input delay time information about the other game device to the other game device through the network.

The input delay time setting section 119 may calculate the difference in display delay time between the game device and another game device based on the display delay time information about the game device and the display delay time information about the other game device received from the other game device.

The display delay time setting section 120 sets the display delay time information about the game device based on input information input by the user.

The input operation definition information generation section 121 generates the input operation definition information that defines the relationship between the input operation performed using the game device and the movement information based on a setting input that sets the relationship between the input operation performed using the game device and the movement information used in common in each game device.

The drawing section 130 performs a drawing process based on the results of various processes (game process) performed by the processing section 100 to generate an image, and outputs the generated image to the display section 190. When generating a three-dimensional game image, the drawing section 130 receives object data (model data) including vertex data (e.g., vertex position coordinates, texture coordinates, color data, normal vector, or alpha value) of each vertex of the object (model), and performs a vertex process (shading using a vertex shader) based on the vertex data included in the received object data (model data). When performing the vertex process, the drawing section 130 may perform a vertex generation process (tessellation, surface division, or polygon division) for dividing the polygon, if necessary. In the vertex process, the drawing section 130 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results. The drawing section 130 then performs a rasterization process (scan conversion) based on the vertex data changed by the vertex process so that the surface of the polygon (primitive) is associated with pixels. The drawing section 130 then performs a pixel process (shading using a pixel shader or a fragment process) that draws the pixels that form the image (fragments that form the display screen). In the pixel process, the drawing section 130 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to the image buffer 174 (i.e., a buffer that can store image information in pixel unit; VRAM or rendering target). Specifically, the pixel process includes a per-pixel process that sets or changes the image information (e.g., color, normal, luminance, and alpha value) in pixel unit. The drawing section 130 thus generates an image viewed from the virtual camera (given viewpoint) in the object space. When a plurality of virtual cameras (viewpoints) are provided, the drawing section 130 may generate an image so that images (divided images) viewed from the respective virtual cameras are displayed on one screen.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 130 performs a geometric process, texture mapping, hidden surface removal, alpha blending, and the like when drawing the object.

In the geometric process, the drawing section 130 subjects the object to coordinate transformation, clipping, perspective projection transformation, light source calculation, and the like. The object data (e.g., object's vertex position coordinates, texture coordinates, color data (luminance data), normal vector, or alpha value) subjected to the geometric process (perspective transformation) is stored in an object data storage section (not shown).

The term "texture mapping" refers to a process that maps a texture (texel value) stored in a texture storage section of the storage section 170 onto the object. Specifically, the drawing section 130 reads a texture (surface properties such as color (RGB) and alpha value) from the texture storage section of the storage section 170 using the texture coordinates set (given) to the vertices of the object and the like. The drawing section 130 maps the texture (two-dimensional image) onto the object. In this case, the drawing section 130 performs a pixel-texel association process, a bilinear interpolation process (texel interpolation process), and the like.

The drawing section 130 may perform a hidden surface removal process by a Z-buffer method (depth comparison method or Z-test) using a Z-buffer (depth buffer) that stores the Z-value (depth information) of the drawing pixel. Specifically, the drawing section 130 refers to the Z-value stored in the Z-buffer when drawing the drawing pixel corresponding to the primitive of the object. The drawing section 130 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha blending" refers to a translucent blending process (e.g., normal alpha blending, additive alpha blending, or subtractive alpha blending) based on the alpha value (A value).

Note that the alpha value is information that can be stored in association with each pixel (texel or dot), such as additional information other than the color information. The alpha value may be output as mask information, translucency (equivalent to transparency or opacity), bump information, or the like.

The sound generation section 140 performs a sound process based on the results of various processes performed by the processing section 100 to generate game sound such as background music (BGM), effect sound, or voice, and outputs the generated game sound to the sound output section 192.

2. Method According to this Embodiment 2-1. Outline

A game system according to this embodiment is a game system that implements an online fighting game. Specifically, the game system according to this embodiment reduces the strength value of an opposing player's character when a player's character operated by the player has attacked and damaged the opposing player's character operated by another player, and determines victory or defeat based on the strength value of each player's character.

Figure 2:
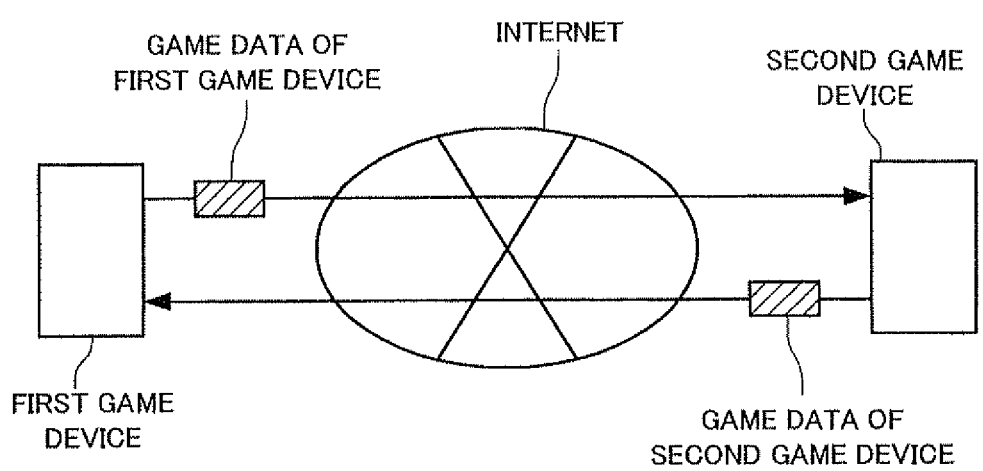
FIG. 2 is a diagram illustrating a network according to one embodiment of the invention.

FIG. 2 illustrates an example of the game system according to this embodiment. The game system according to this embodiment is a peer-to-peer game system that allows each game device that participates in the online game to directly communicate and share data via the Internet. In the game system according to this embodiment, the players who participate in the online game play the game in a state in which the player's characters operated by the players are present in a single game space (object space).

In this embodiment, a first game device and a second game device transmit and receive game data including the detection result of information (input information) input by the player who operates each game device, and perform game calculations.

The game data also includes key input information (e.g., a detection signal detected every frame based on an input using a direction key, a button A, a button B, or the like), information obtained by converting the key input detection result to a specific command (movement information), and information that indicates the absence of the input information (e.g., no-key-input information).

In this embodiment, the first game device performs game calculations such as calculations of the movement/motion of a first player's character (i.e., a player's character operated by a first player who uses the first game device) based on game data of the first game device, and transmits the game data of the first game device to the second game device through the network. The first game device performs game calculations such as calculations of the movement/motion of a second player's character (i.e., a player's character operated by a second player who uses the second game device) based on game data of the second game device received through the network. The second game device performs game calculations in the same manner as the first game device.

2-2. Synchronization Process

In this embodiment, the first game device and the second game device exchange game data using a common identification number that is associated with the game data every frame in order to implement a synchronization process.

Specifically, each game device acquires game data in the same cycle with the drawing frame rate. The identification number is then associated with the acquired game data. Specifically, when the drawing frame rate is 60 fps, the identification number that is a positive integer (i.e., "1", "2", "3", "4" . . . ) is sequentially associated with game data acquired every 1/60th of a second after connection between the first game device and the second game device has been established.

It is desirable that the first game device and the second game device use an identical drawing frame rate (e.g., 60 fps) in order to accurately perform the synchronization process using game data acquired at an identical timing. The following description is given on the assumption that the drawing frame rate of the first game device and the second game device is 60 fps.

Note that the expression "when connection between the first game device and the second game device has been established" refers to the time when the first game device has received an acknowledgment of a connection request transmitted to the second game device and the second game device has received an acknowledgment of a connection request transmitted to the first game device. Note that the time when connection between the first game device and the second game device has been established may differ to some extent between the first game device and the second game device with respect to the absolute time axis.

In the game device according to this embodiment, the first buffer 176 that sequentially stores and temporarily holds the game data of the game device and the second buffer 178 that sequentially stores and temporarily holds the game data of another game device are provided in the storage section. The game device stores the game data of the game device associated which the identification number in the first buffer 176, and stores the game data of another game device associated with the identification number in the second buffer 178. The game device transmits the game data of the game device associated with the identification number to the other game device.

In this embodiment, the game device outputs the game data stored in the first buffer 176 and the game data stored in the second buffer 178 on condition that the identification number associated with the game data stored in the first buffer 176 and having an elapsed time after input that has exceeded the input delay time (i.e., the scheduled calculation time coincides with the game time) coincides with the identification number associated with the game data stored in the second buffer 178 and having an elapsed time after input that has exceeded the input delay time (i.e., the scheduled calculation time coincides with the game time).

In this embodiment, the game device sequentially outputs the game data for which the scheduled calculation time has been reached from the first buffer 176, performs game calculations such as calculations of the movement/motion of the first player's character based on the game data output from the first buffer 176, sequentially outputs the game data for which the scheduled calculation time has been reached from the second buffer 178, and performs game calculations such as calculations (motion calculations) of the movement/motion of the second player's character based on the game data output from the second buffer 178.

The first buffer 176 and the second buffer 178 may be configured so that the game data is input and output by a first-in, first-out (FIFO) method. The first buffer 176 and the second buffer 178 may be FIFO-controlled by means of software.

Figure 3:
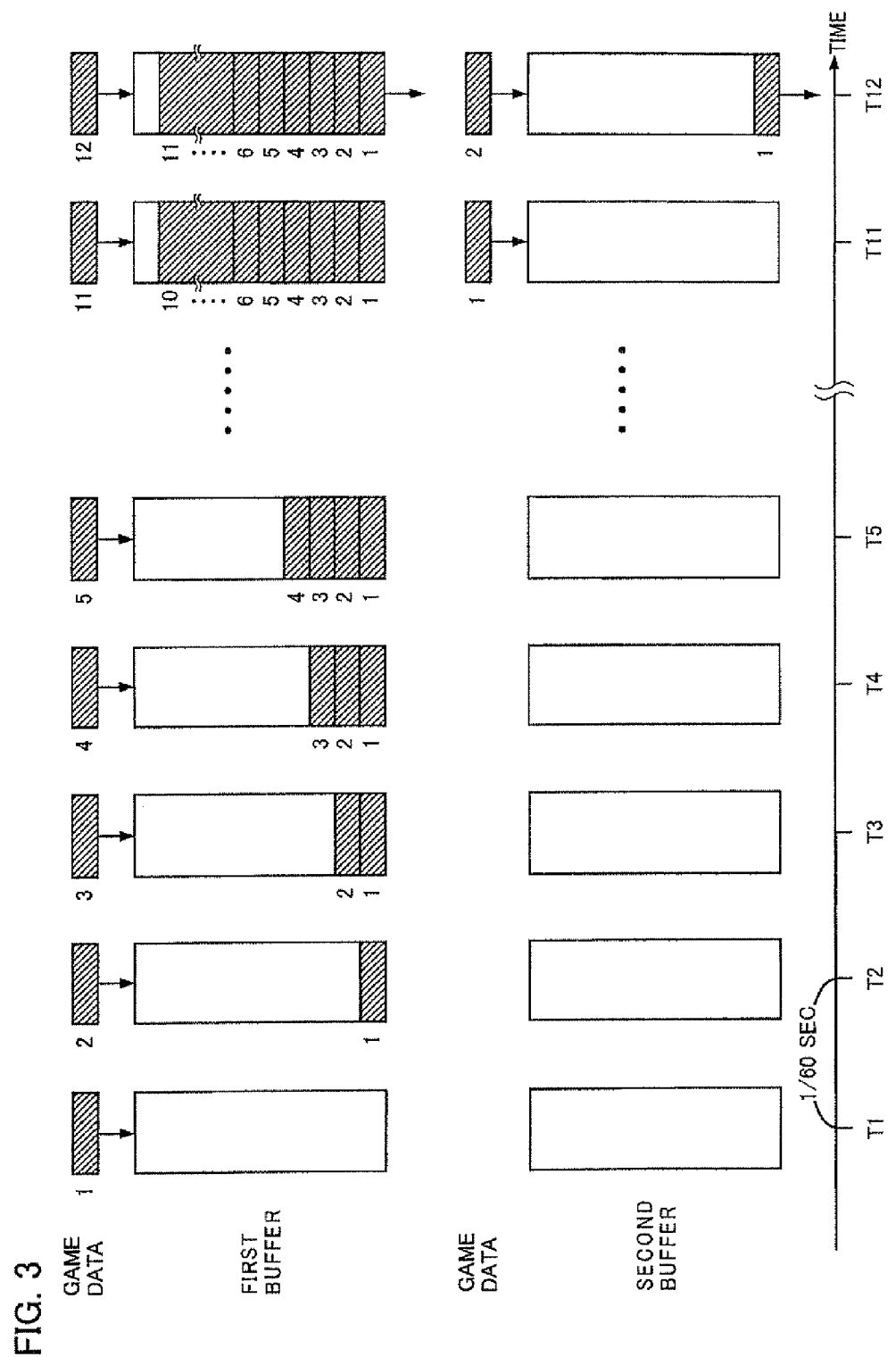
FIG. 3 is a diagram illustrating a synchronization process.

A process in which the first game device inputs and outputs the game data of the first game device to and from the first buffer 176 and inputs and outputs the game data of the second game device to and from the second buffer 178 is described in detail below with reference to FIG. 3.

In this embodiment, the first game device inputs game data of the first game device having an identification number "1" to the first buffer 176 at a time T1 when connection between the first game device and the second game device has been established. Since the first game device has not received game data from the second game device at the time T1, the second buffer 178 is empty.

When the first game device has received game data having an identification number "1" from the second game device at a time T11, the first game device inputs game data having an identification number "11" to the first buffer 176, and inputs the game data having the identification number "1" that has been received from the second game device to the second buffer 178.

Therefore, the identification information associated with the first game data stored in the first buffer 176 coincides with the identification information associated with the first game data stored in the second buffer 178 (i.e., the identification number is "1").

In this embodiment, the input delay time is set in order to absorb a communication delay (described later). For example, when the input delay time is x (frames), the input information that is input in the nth frame is calculated in the (n+x)th frame. For example, when the input delay time is 1/60th of a second×11 (11 frames), the input delay time for the game data having an identification number "1" stored in the first buffer and the second buffer has elapsed at a time T12. Therefore, the game data is output from the first buffer 176 and the second buffer 178, and game calculations are performed based on the game data output from the first buffer 176 and the second buffer 178.

According to this embodiment, since each of the first game device and the second game device transmits and receives the game data using a common identification number that is given every frame and performs game calculations based on the game data of the first game device and the game data of the second game device corresponding to the identification number for which the scheduled calculation time has been reached, each of the first game device and the second game device can perform game calculations while absorbing a communication delay so that an identical game result is obtained even when executing an online fighting game.

2-3. Input Delay Time Setting Method

Figure 4:
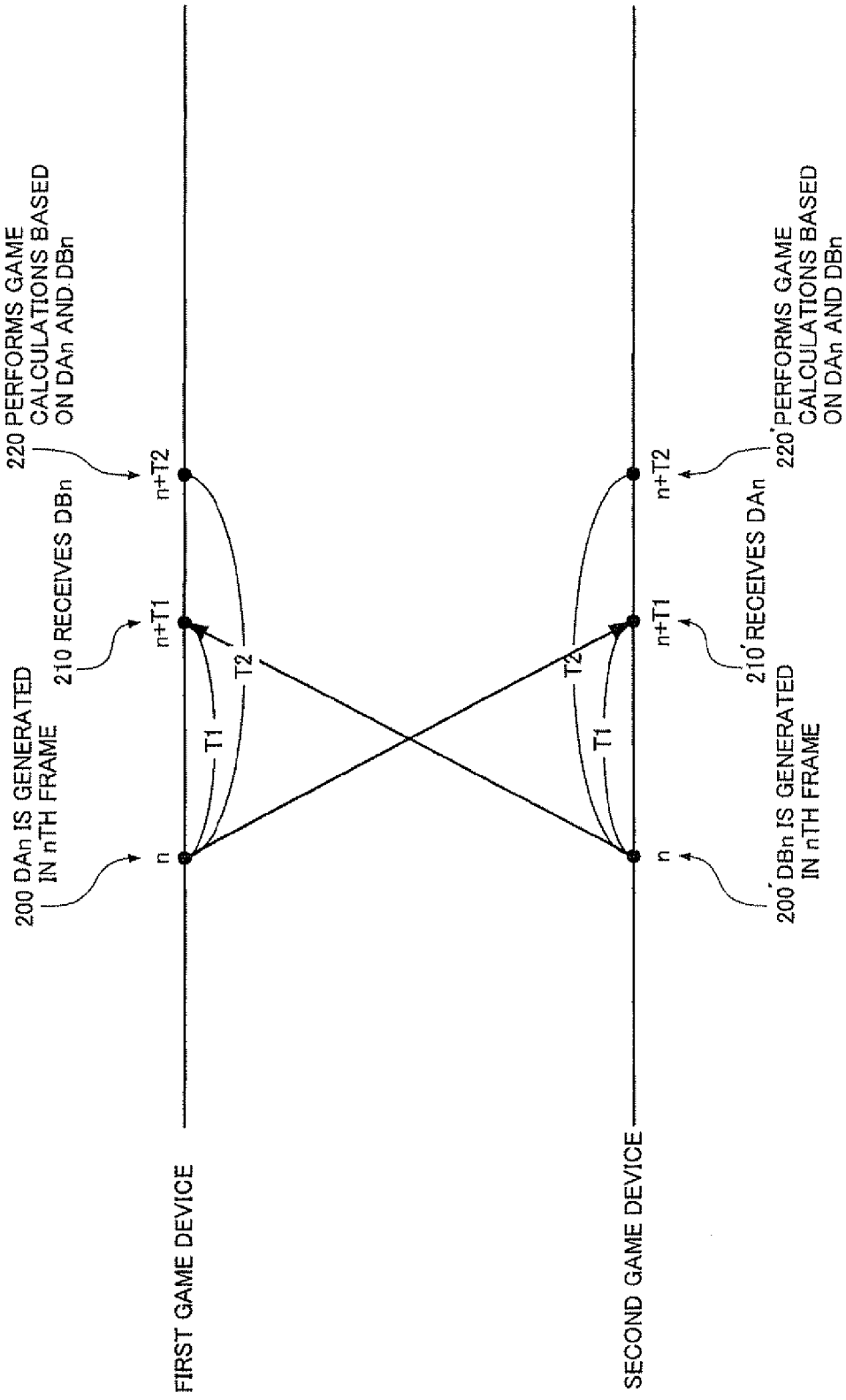
FIG. 4 is a diagram illustrating an input delay time setting method.

FIG. 4 is a diagram illustrating an input delay time setting method.

In the nth frame, the first game device generates game data DAn based on input information (see 200), and the second game device generates game data DBn based on input information (see 200'). The nth frame refers to an in-game time that is used in common in the first game device and the second game device, and may be a frame sequence number that is used in common in the first game device and the second game device after synchronization between the first game device and the second game device has been established.

The game data DAn generated by the first game device in the nth frame is transmitted to the second game device. The game data transmitted from the first game device reaches the second game device after a given time T1 has elapsed (see 210'). The game data DBn generated by the second game device in the nth frame is transmitted to the first game device. The game data transmitted from the second game device reaches the first game device after the given time T1 has elapsed (see 210).

The given time T1 is a time required for communication, and is hereinafter referred to as a communication delay time. The communication delay time changes due to the state of the network and the state of each game device.

An input delay time T2 is set in order to absorb such a communication delay. The input delay time T2 is a value that indicates the number of frames (or seconds) that have elapsed before game calculations are performed after the game data has been input. Specifically, the first game device and the second game device perform game calculations in the (n+T2)th frame based on the input information input in the nth frame (i.e., the game data DAn generated by the first game device and the game data DBn generated by the second game device) (see 220 and 220').

In this embodiment, the game device performs a test communication between the game device and another game device (opponent) at a predetermined timing (e.g., before the game starts or when the opponent has been determined) to measure the communication delay time between the game device and the other game device. The game device then sets an input delay time that is longer than the measured communication delay time, and transmits the input delay time to the other game device through the network. Note that one of the game devices sets the input delay time and transmits the input delay time to the other game device. For example, the first game device may set the input delay time and transmit the input delay time to the second game device.

A communication delay can be absorbed by setting the input delay time T2 to be longer than the measured communication delay time T1. A communication delay can be absorbed when the input delay time T2 is equal to or longer than the communication delay time T1 (input delay time T2≥communication delay time T1). However, since the input operation of the player is reflected in the game after a longer period of time has elapsed as the input delay time T2 increases, it is preferable to set the input delay time T2 at an appropriate value that satisfies the condition "input delay time T2≥communication delay time T1".

The above description has been given taking an example in which the input delay time of the first game device is the same as the input delay time of the second game device. Note that the input delay time of the first game device may differ from the input delay time of the second game device, as described later.

Figure 13:
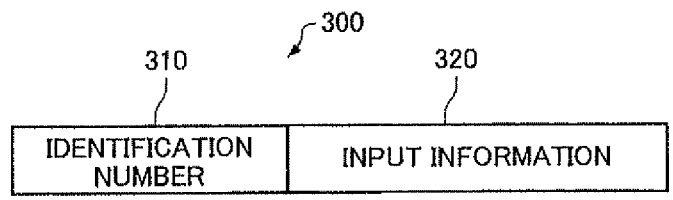
FIG. 13 is a diagram illustrating game data generated based on input information.

FIG. 13 is a diagram illustrating the game data generated based on the input information.

In this embodiment, game data of the game device associated with the identification number (sequence data) corresponding to each frame is generated every frame (or in a predetermined drawing unit) based on input information input to the game device. Specifically, game data 300 includes an identification number 310 and input information.

The identification number may be a number corresponding to the frame when the input information is input. In this case, the synchronization control section subtracts the input delay time from the current in-game time to determine the identification number corresponding to the calculation target frame, and extracts the game data having the identification number corresponding to the calculation target frame. In this way, the synchronization control section extracts the game data (sequentially from the oldest in-game elapsed time) for which the in-game elapsed time that has elapsed after the input information corresponding to the game data has been input has reached the input delay time.

Figure 5:
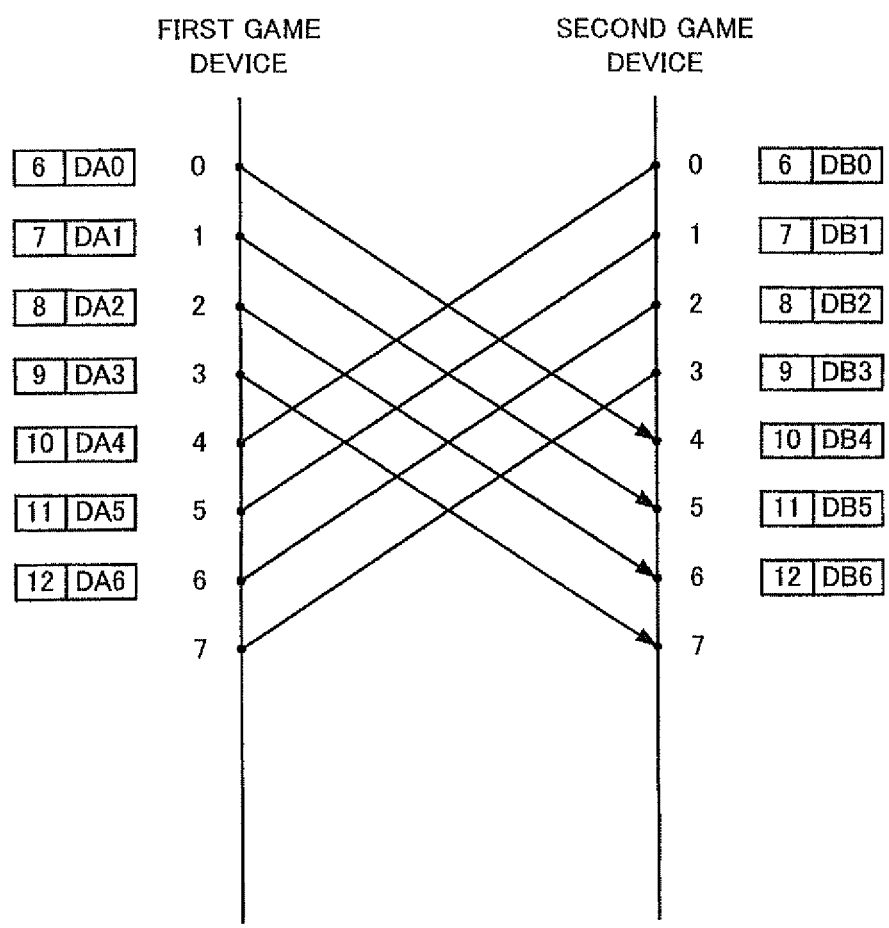
FIG. 5 is a diagram illustrating an example of generating game data that reflects an input delay time.

FIG. 5 is a diagram illustrating an example of generating the game data that reflects the input delay time.

The game data generation section may generate the game data of the game device based on the input delay time and the in-game time when the input information is input to the game device, the identification number corresponding to the frame at the scheduled calculation time that reflects the input delay time being given to the game data.

An example in which each game device generates game data irrespective of the presence or absence of input information (game data including input information is generated when input information has been input, and game data that indicates "no input" is generated when input information has not been input) and transmits the generated game data to the other game device at predetermined intervals is described below. The data transmission interval may be n frames, for example. In this case, game data corresponding to the n frames is collectively transmitted. The following description illustrates an example in which game data corresponding to one frame is transmitted every frame for convenience.

Suppose that the input delay time is six frames, for example. When the first game device generates game data DA0 in the 0th frame, the first game device adds the frame number (0th frame) when the input information has been input to the input delay time (six frames) to calculate the scheduled calculation time "6" (sixth frame), and generates the game data having an identification number "6".

Likewise, the first game device generates game data DA1 associated with an identification number "7" in the first frame, generates game data DA2 associated with an identification number "8" in the second frame, and generates game data DAn associated with an identification number "n+6" in the nth frame.

When the second game device generates game data DB0 in the 0th frame, the second game device adds the frame number (0th frame) when the input information has been input to the input delay time (six frames) to calculate the scheduled calculation time "6" (sixth frame), and generates the game data DB0 associated with an identification number "6".

Likewise, the second game device generates game data DB1 associated with an identification number "7" in the first frame, generates game data DB2 associated with an identification number "8" in the second frame, and generates game data DBn associated with an identification number "n+6" in the nth frame.

Figure 6:
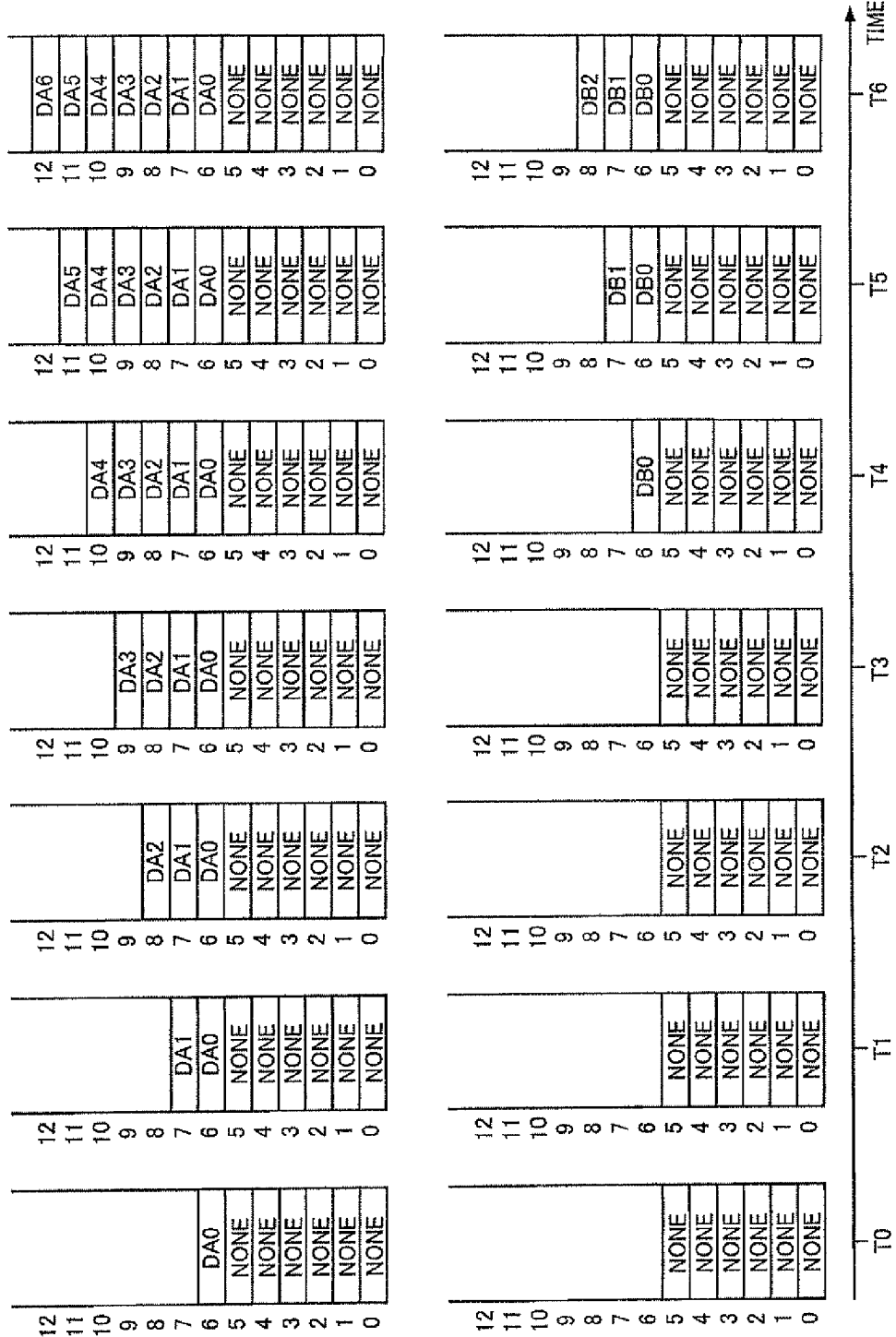
FIG. 6 is a diagram schematically illustrating a state in which game data is stored in a first buffer and a second buffer of a first game device.

FIG. 6 is a diagram schematically illustrating a state in which the game data is stored in the first buffer and the second buffer of the first game device.

The first buffer and the second buffer are provided with an area corresponding to the identification number. Each area can be used when data stored in each area has been output. The identification number is sequentially associated with each area that can be used.

In this example, since the input delay time is six frames, data that indicates "no input" is stored in the areas corresponding to the identification numbers 0 to 5. When the first game device has generated the game data of the first game device, the game data is stored in the first buffer within that frame. The game data is stored in the area corresponding to the scheduled calculation time. Specifically, since the game data generated by the first game device in the 0th frame is used for game calculations in the sixth frame, the game data is stored in the area corresponding to the identification number "6". The game data subsequently generated in each frame is stored in the area corresponding to the scheduled calculation time within each frame.

On the other hand, since the game data DB0 generated by the second game device in the 0th frame is received by the first game device in the fourth frame, the game data DB0 is stored in the second buffer in the fourth frame. The game data DB0 is stored in the area corresponding to the scheduled calculation time. Specifically, since the game data DA0 generated by the second game device in the 0th frame is used for game calculations in the sixth frame, the game data is stored in the area corresponding to the identification number "6". The game data subsequently generated by the second game device in each frame is sequentially received by the first game device, and is stored in the area of the second buffer corresponding to the scheduled calculation time within each frame.

Figure 7:
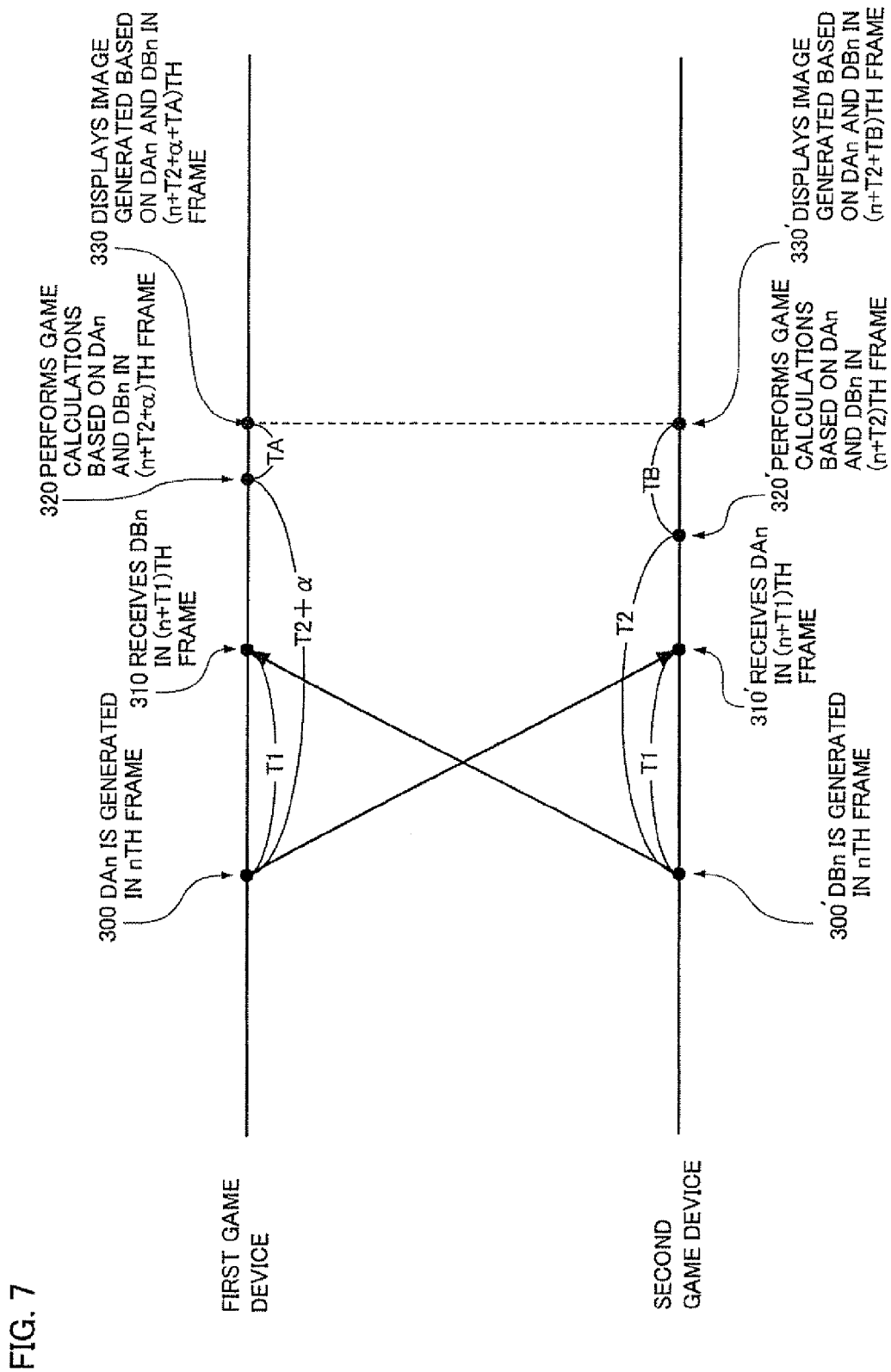
FIG. 7 is a diagram illustrating another example of an input delay time setting method.

FIG. 7 is a diagram illustrating another example of the input delay time setting method.

In FIG. 4, the same input delay time is set for the first game device and the second game device based on the communication delay time. In FIG. 7, different input delay times are set for the first game device and the second game device based on the communication delay time and the display delay time of each game device.

In the nth frame, game data DAn is generated by the first game device based on the input information (see 300), and game data DBn is generated by the second game device based on the input information (see 300'). The nth frame refers to an in-game time that is used in common in the first game device and the second game device, and may be a frame sequence number that is used in common in the first game device and the second game device after synchronization between the first game device and the second game device has been established.

The game data DAn generated by the first game device in the nth frame is transmitted to the second game device. The game data transmitted from the first game device reaches the second game device after the communication delay time T1 has elapsed (see 310'). The game data DBn generated by the second game device in the nth frame is transmitted to the first game device. The game data transmitted from the second game device reaches the first game device after the communication delay time T1 has elapsed (see 310).

The display time of the first game device is referred to as TA, and the display time of the second game device is referred to as TB. The term "display time" refers to the time required to perform game calculations to generate an image that reflects the game calculation results and display the image on the display section (hereinafter referred to as "display delay time").

When the display delay time TA of the first game device is one frame and the display delay time TB of the second game device is two frames, an image that reflects the calculation results is displayed on the first game device after one frame has elapsed and an image that reflects the calculation results is displayed on the second game device after two frames have elapsed when the first game device and the second game device have started game calculations at the same timing.

In this embodiment, the calculation start timing of the game device having a shorter display delay time (first game device in this example) is delayed by the difference alpha in display delay time between the first game device and the second game device (i.e., two frames−one frame=one frame), so that an image that reflects the calculation results can be displayed on the first game device and the second game device at the same timing.

Specifically, the input delay time of the game device having a shorter display delay time (first game device in this example) is set to be longer than the input delay time of the game device having a longer display delay time (second game device in this example) by the difference alpha in display delay time, so that an image that reflects the calculation results can be displayed on the first game device and the second game device at the same timing.

As illustrated in FIG. 7, the input delay time of the game device having a shorter display delay time (first game device in this example) is set to be a value obtained by adding the difference alpha in display delay time to the input delay time T2 set based on the communication delay time. Therefore, the first game device starts game calculations in the (n+T2+alpha)th frame based on the game data DAn and the game data DBn (see 320), and displays a game image generated based on the game data DAn and the game data DBn in the (n+T2+alpha+TA)th frame (see 330). The second game device starts game calculations in the (n+T2)th frame based on the game data DAn and the game data DBn (see 320'), and displays a game image generated based on the game data DAn and the game data DBn in the (n+T2+TB)th frame (see 330'). Since n+T2+alpha+TA=n+T2+TB, the game image generated based on the game data DAn and the game data DBn is displayed on the first game device and the second game device at the same timing.

When each game device has information about the display delay time according to type information (e.g., manufacturer or serial number information) about the display device of each game device, the type information about each game device may be acquired, and the display delay times of the first game device and the second game device may be determined based on the information about the display delay time according to the type information.

Alternatively, the game device may be configured so that the user can input the display delay time of the game device, and the display delay times of the first game device and the second game device may be determined based on the display delay time input by the user.

Alternatively, the game device may be configured so that the game device automatically determines the display delay time of the game device based on test input information input by the user, and a difference in the display delay time between the first game device and the second game device may be determined based on the display delay time that has been automatically determined.

For example, a test image may be displayed as a test input screen every predetermined number of frames. The user presses a button at the test image display timing, and the display delay time may be determined based on the button press timing. Specifically, when the display delay time is referred to as TA (frames), the test image generation process starts in the mth frame, and the test image is displayed in the (m+TA)th frame. When the user has pressed a button at the test image display timing, the display delay time is determined based on the difference between the button input timing and the test image generation process start timing.

The game device transmits the display delay time information about the game device to another game device through the network, and receives the display delay time information transmitted from the other game device through the network.

Figure 8:
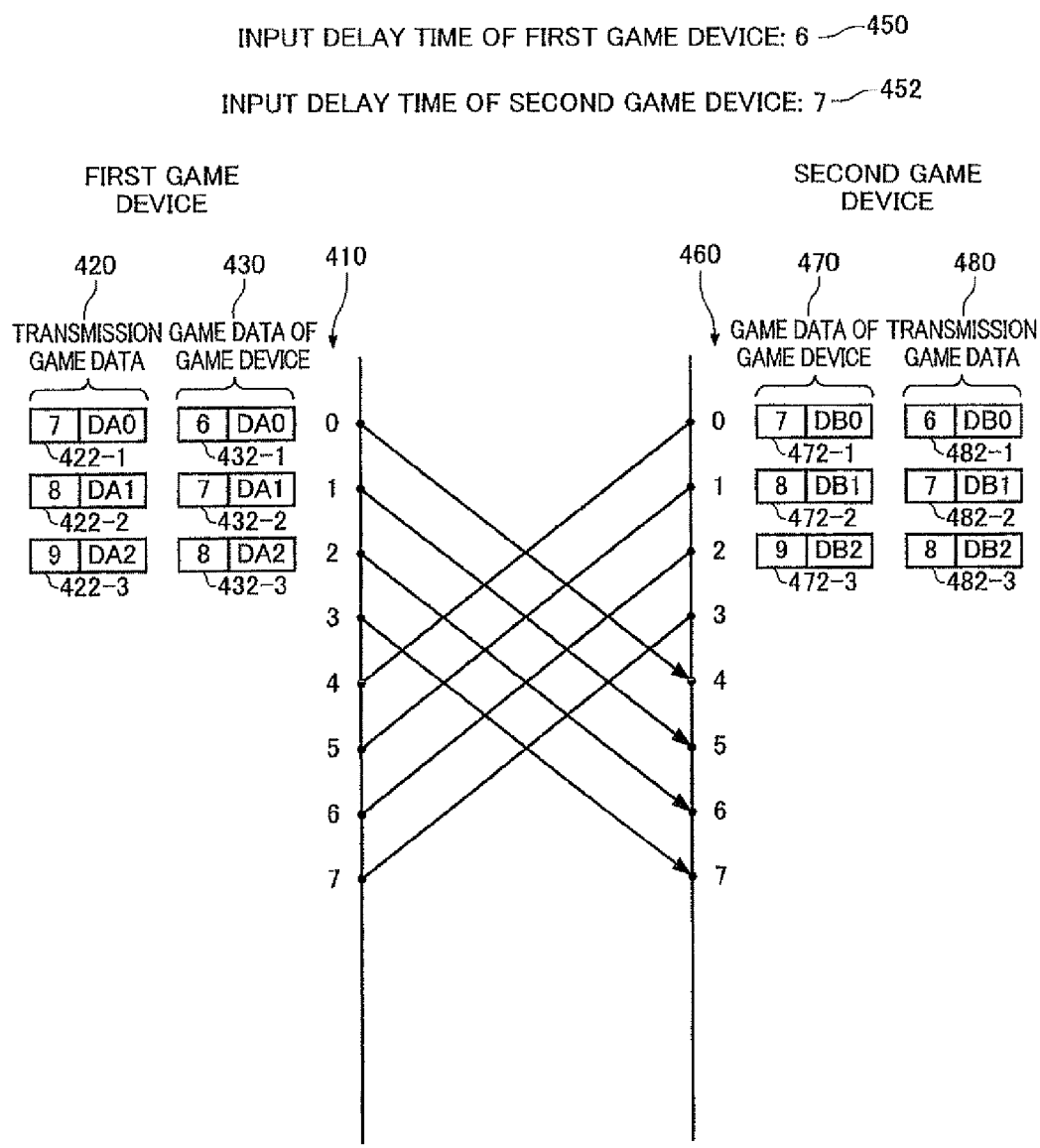
FIG. 8 is a diagram illustrating an example of generating game data that reflects an input delay time that differs between game devices.

FIG. 8 is a diagram illustrating an example of generating the game data that reflects the input delay time that differs between the game devices.

FIG. 8 illustrates an example of generating the game data when the input delay time of the first game device is "6" (see 450) and the input delay time of the second game device is "7" (see 452) (i.e., the input delay time of the first game device differs from the input delay time of the second game device).

The game data generation section of the first game device generates game data 430 to which an identification number 432-1, 432-2, or 432-3 corresponding to the frame at the scheduled calculation time that reflects the input delay time 450 of the first game device is given, based on an in-game time 410 when input information is input to the first game device and the input delay time 450 of the first game device. For example, the identification number 432-1 of game data DA0 generated in the 0th frame (in-game time) is "6" that is obtained by adding "6" (sixth frame) (i.e., the input delay time 450 of the first game device) to the in-game time "0" (0th frame). The game data 430 of the first game device is stored in the first buffer of the first game device.

The game data generation section of the first game device generates game data 420 to which an identification number 422-1, 422-2, or 422-3 corresponding to the frame at the scheduled calculation time that reflects the input delay time 452 of the second game device is given, based on the in-game time 410 when input information is input to the first game device and the input delay time 452 of the second game device. For example, the identification number 422-1 of game data DA0 generated in the 0th frame (in-game time) is "7" that is obtained by adding "7" (seventh frame) (i.e., the input delay time 452 of the second game device) to the in-game time "0" (0th frame). The transmission game data 420 is transmitted to the second game device, and stored in the second buffer of the second game device.

The game data generation section of the second game device generates game data 470 to which an identification number 472-1, 472-2, or 472-3 corresponding to the frame at the scheduled calculation time that reflects the input delay time 452 of the second game device is given, based on an in-game time 460 when input information is input to the second game device and the input delay time 452 of the second game device. For example, the identification number 472-1 of game data DB0 generated in the 0th frame (in-game time) is "7" that is obtained by adding "7" (seventh frame) (i.e., the input delay time 452 of the second game device) to the in-game time "0" (0th frame). The game data 470 of the second game device is stored in the first buffer of the second game device.

The game data generation section of the second game device generates game data 480 to which an identification number 482-1, 482-2, or 482-3 corresponding to the frame at the scheduled calculation time that reflects the input delay time 450 of the first game device is given, based on an in-game time 610 when input information is input to the second game device and the input delay time 450 of the first game device. For example, the identification number 482-1 of game data DB0 generated in the 0th frame (in-game time) is "6" that is obtained by adding "6" (sixth frame) (i.e., the input delay time 450 of the first game device) to the in-game time "0" (0th frame). The transmission game data 480 is transmitted to the first game device, and stored in the second buffer of the first game device.

2-4. Communication Delay Time Determination Process

Figure 9:
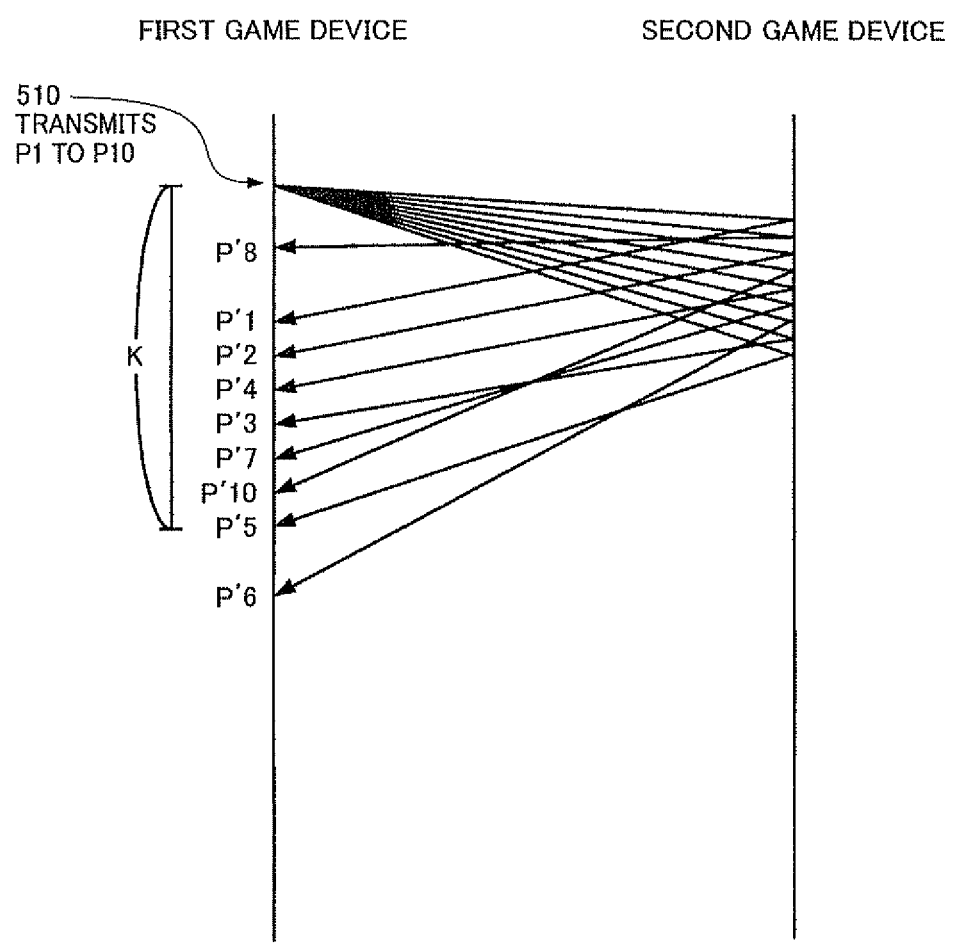
FIG. 9 is a diagram illustrating a communication delay time determination process.

FIG. 9 is a diagram illustrating a communication delay time determination process according to this embodiment.

The communication delay time determination section 118 according to this embodiment sequentially performs a test communication that transmits and receives a packet between the game device and another game device a plurality of times at a predetermined timing (before the game starts or when the opponent has been determined), and determines the communication delay time based on the results of the test communication.

The communication delay time determination section 118 may determine the communication delay time based on the test communication state (reception timing of a reply packet received within a predetermined period) within a predetermined period after starting the test communication. The term "test communication state within a predetermined period" refers to the time that has elapsed until a reply packet is received within a predetermined period, for example.

A test communication T includes transmitting a reply request packet P from the game device to another game device and receiving a reply packet P' transmitted to the game device from the other game device that has received the packet P. FIG. 9 illustrates an example in which a test communication T1 (transmission of packet P1 and reception of a reply packet P'1) to a test communication T10 (transmission of a packet P10 and reception of a reply packet P'10) are performed. When sequentially performing the test communication a plurality of times, a plurality of packets P1 to PN may be collectively transmitted, or a subsequent packet Pn+1 may be transmitted without waiting for reception of the reply packet P'n in response to the transmitted packet Pn, for example.

The communication delay time may be determined based on the time required for the test communication (i.e., the time that has elapsed until the packet P' is received after transmitting the packet P), or may be determined based on the time that has elapsed from the first communication timing (communication start timing 510) to the reception timing of the reply packet P' received within a predetermined period K, for example. The communication delay time may be determined based on the time (elapsed time) required for the test communication that satisfies a predetermined condition.

FIG. 9 illustrates a communication state when ten packets P1 to P10 are transmitted from the first game device to the second game device at the test communication start timing 510. When the communication state is good, the second game device receives the packets P1 to P10 transmitted from the first game device and transmits the reply packets P'1 to P'10 corresponding to the packets P1 to P10, and the first game device receives the reply packets P'1 to P'10. In FIG. 9, the first game device has not received the reply packet P'9 corresponding to the packet P9 (including a case where the second game device has not received the packet P9 and a case where the first game device has not received the reply packet P'9 although the second game device has received the packet P9 and transmitted the reply packet P'9).

For example, the communication delay time may be determined based on the average value of the times that have elapsed until reception of reply packets (P'2, P'4, P'3, and P'7) among the reply packets P'8, P'1, P'2, P'4, P'3, P'7, P'10, and P'5 received within the predetermined period K from the first communication timing 510 other than m reply packets received within a short time from the first communication timing 510 (P'8 and P'1 when m=2) and m reply packets received after a long time has elapsed from the first communication timing 510 (P'10 and P'5 when m=2). The reply packet P'6 received after the predetermined period has elapsed is not used to calculate the average value. This also applies to the reply packet P'9 (test communication T9) that has not been received.

Therefore, since the communication delay time can be calculated using the communication results of the test communication for which a reply has been received within the predetermined period K from the first communication timing 510, the communication delay can be efficiently measured even when the communication state is poor.

FIG. 15 is a diagram illustrating an example of setting the input delay time based on the communication delay time.

In this embodiment, the input delay time is set to be longer than the measured communication delay time. For example, the input delay time is set so that "T2=T1+beta" (where, T1 is the communication delay time, T2 is the input delay time, and beta is a predetermined offset) is satisfied.

Note that the offset beta may not be a constant value (i.e., may change depending on the communication delay time T1). For example, the range of the communication delay time may be divided into a plurality of ranges, and the relationship between each range 522 and an input delay time 524 may be defined in advance and stored as a table or incorporated in an algorithm. The input delay time may be set based on the input delay time 524 defined corresponding to the range 522 to which the measured communication delay time belongs (the defined input delay time 524 may be directly used as the input delay time when the display delay time is not taken into account).

2-5. Game Data Generation Process

Figure 10A:
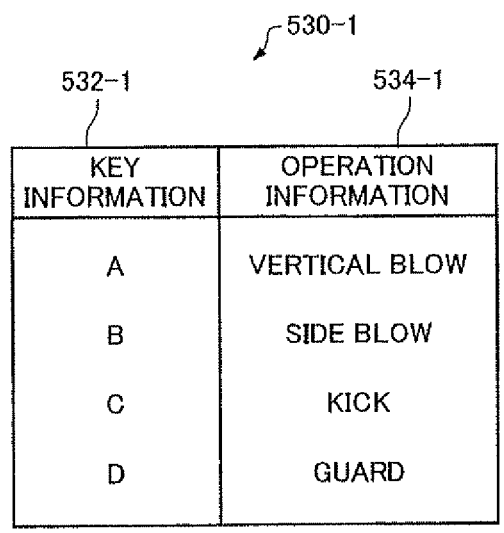
FIGS. 10A and 10B are diagrams illustrating input operation definition information.
Figure 10B:
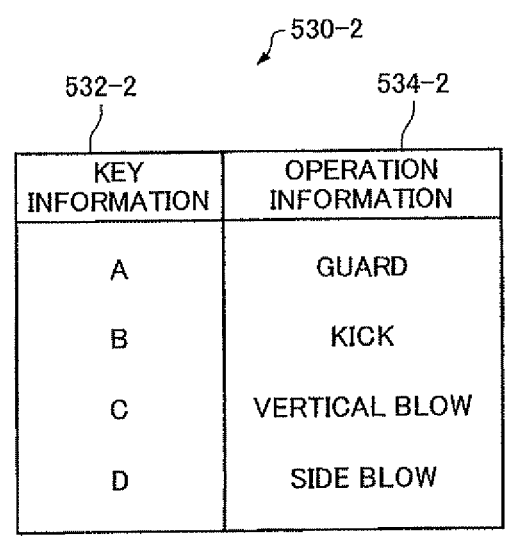

FIGS. 10A and 10B are views illustrating the input operation definition information.

The game device according to this embodiment allows the player to allocate a desired movement command to an input operation using a predetermined key (e.g., button A, button B, button C, or button D). The term "movement command" refers to movement information used in common in each game. The input operation definition information generation section may display a key customization screen or the like for receiving a setting input from the player. The input operation definition information generation section generates the input operation definition information that defines the relationship between the input operation and the movement information (movement command) based on the setting input information from the player.

FIG. 10A illustrates an example of the input operation definition information of the first game device, and FIG. 10B illustrates an example of the input operation definition information of the second game device. Input operation definition information 530-1 or 530-2 may be set as a table or an algorithm that indicates the relationship between key information 532-1 or 532-2 (information that indicates the type of button pressed by the player) and movement information 534-1 or 534-2 corresponding to the type of button. The movement information "vertical blow", "side blow", "kick", and "guard" may indicate common movement commands similarly interpreted and executed in the first game device and the second game device.

In the first game device, the movement information "vertical blow" is assigned to the button A, the movement information "side blow" is assigned to the button B, the movement information "kick" is assigned to the button C, and the movement information "guard" is assigned to the button D.

In the second game device, the movement information "guard" is assigned to the button A, the movement information "kick" is assigned to the button B, the movement information "vertical blow" is assigned to the button C, and the movement information "side blow" is assigned to the button D.

Figure 14A:
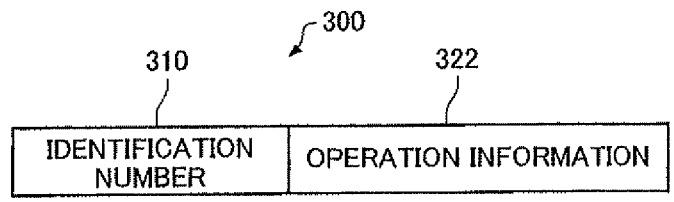
FIGS. 14A and 14B are diagrams illustrating the configuration of game data.

For example, the game data generation section may convert the input operation that has been performed using the game device and is indicated by the input information into the corresponding movement information based on the input operation definition information, and may generate game data 300 including movement information 322 as the input information (see FIG. 14A). In this case, the first game device generates game data including the movement information "vertical blow" when the button A has been pressed, and the second game device generates game data including the movement information "guard" when the button A has been pressed.

Therefore, since the game device can receive the game data of another game device as the movement information, the game device can perform game calculations without taking account of the input operation definition information of the other game device (i.e., without receiving the input operation definition information).

Figure 14B:
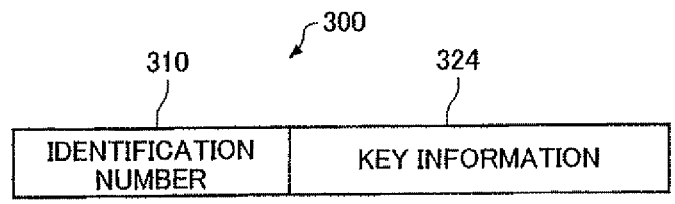

The game data generation section may generate game data 300 including input operation information (key information) 324 indicated by the input information (see FIG. 14B). In this case, the first game device generates game data including the key information "A" when the button A has been pressed, and the second game device generates game data including the key information "A" when the button A has been pressed.

Since the first game device and the second game device differ in the operation indicated by the key information "A", the game calculation section converts the input operation information included in the game data extracted from the first buffer into the movement information of the game device corresponding to the input operation based on the input operation definition information of the game device (530-1 in FIG. 10A when the game device is the first game device), converts the input operation information included in the game data extracted from the second buffer into the movement information of the game device corresponding to the input operation based on the input operation definition information of the other game device (530-2 in FIG. 10B when the game device is the first game device), and performs game calculations in each frame based on the movement information of the game device and the movement information of the other game device. For example, the game calculation section converts the key information "A" included in the game data extracted from the first buffer into the movement information "vertical blow", converts the key information "A" included in the game data extracted from the second buffer into the movement information "guard", and performs game calculations.

When the game device transmits and receives the game data 300 including the input operation information (key information) 324 indicated by the input information, the game device can convert the game data of the other game device into the movement information and perform game calculations by receiving the input operation definition information of the other game device in advance.

2-6. Process Performed when Game Data of Another Game Device has not been Received Even when Input Delay Time has Elapsed The game calculation section according to this embodiment may stop game calculations when the extraction target game data of another game device has not been received (has not been stored in the second buffer), and display the same image as the image in the preceding frame.

Figure 12:
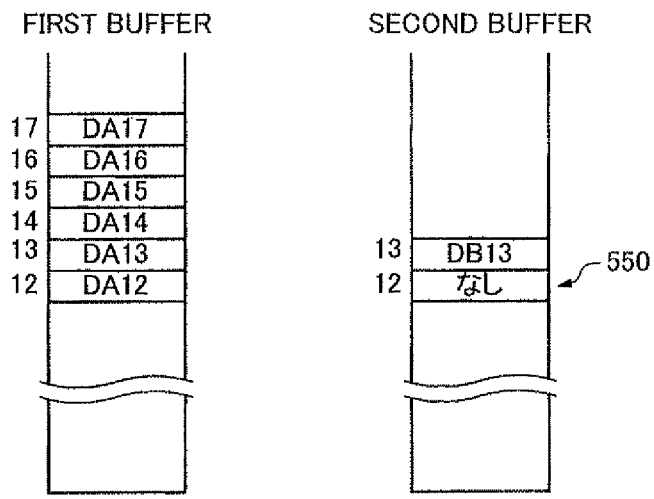
FIG. 12 is a diagram illustrating a process performed when game data of another game device has not been received even when an input delay time has elapsed.

In FIG. 12, when the scheduled calculation frame (identification number) is "12", it is necessary to extract the game data associated with the identification number "12" from the first buffer and the second buffer. When the first game device has not received the game data associated with the identification number "12" from the second game device, the area of the second buffer of the first game device corresponding to the identification number "12" is empty (see 550). For example, when the first buffer and the second buffer are initially set to be empty, the area of the second buffer corresponding to a given identification number is empty unless the game device receives the game data associated with the given identification number from the other game device.

Therefore, the game calculation section determines that the extraction target game data of the other game device has not been received when the area of the second buffer corresponding to the scheduled calculation frame (identification number) "12" is empty. In this case, the game calculation section stops game calculations and displays the same image as the image in the preceding frame. In this case, the in-game elapsed frame is not updated.

The game calculation section resumes game calculations when the extraction target game data of the other game device has been received (has been stored in the second buffer). In this case, the in-game elapsed frame is updated.

2-7. Game Data Communication Control

As a first game data communication configuration according to this embodiment, game data may be transmitted and received according to a first protocol (e.g., UDP) in which game data that has been lost during transmission is not retransmitted. In this case, when the extraction target game data of another game device has not been received (has not been stored in the second buffer), the game device transmits a game data retransmission request while adding the identification number associated with the extraction target game data as retransmission data identification information. When the game device has received a game data retransmission request from another game device, the game device transmits the game data associated with the identification number corresponding to the retransmission data identification information to the other game device.

The case where the extraction target game data of the other game device has not been received refers to a case where the game data of the other game device has not been received (has not been stored in the second buffer) even when the scheduled calculation time has been reached after the communication delay time has elapsed.

Figure 16A:
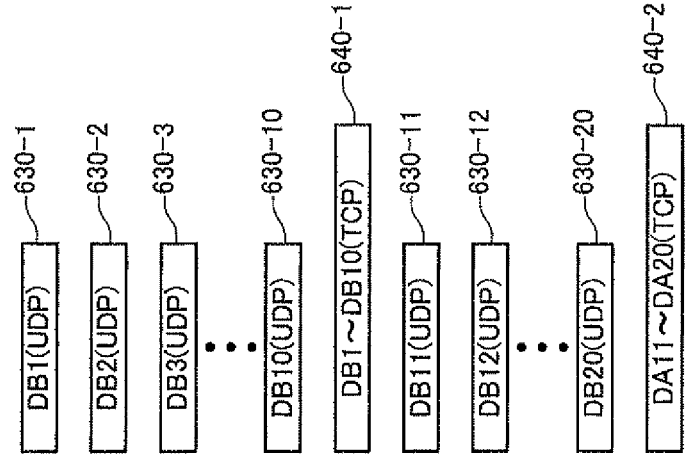
FIGS. 16A and 16B are diagrams illustrating a second game data communication configuration according to one embodiment of the invention.
Figure 16B:
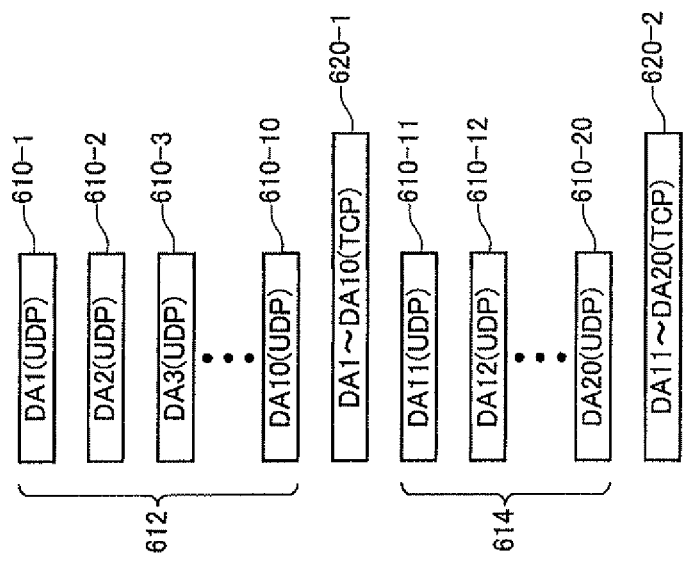

FIGS. 16A and 16B are views illustrating a second game data communication configuration according to this embodiment. FIG. 16A illustrates a packet transmitted by the first game device, and FIG. 16B illustrates a packet received by the first game device.

According to the second communication configuration, each time the first game device transmits n packets (e.g., 610-1 to 610-10 or 610-11 to 610-20) according to the first protocol (UDP) in which game data that has been lost during transmission is not retransmitted, the first game device transmits a packet 620-1 or 620-2 including the game data (e.g., DA1 to DA10 or DA11 to DA20) included in the n packets to the second game device according to the second protocol, as illustrated in FIG. 16A. The first game device normally receives packets transmitted from the second game device according to the first protocol and the second protocol, as illustrated in FIG. 16B.

According to the second communication configuration, when the first game device has not received a packet corresponding to the game data in a given frame from the second game device according to the first protocol, the synchronization control section stores the game data in the given frame included in the packet transmitted from the second game device according to the second protocol in the second buffer. For example, when the first game device has not received a packet 630-3 corresponding to game data DB3 from the second game device according to the first protocol (UDP) in FIG. 16B, the synchronization control section stores the game data DB3 included in a packet 640-1 transmitted from the second game device according to the second protocol (TCP) in the second buffer.

3. Process Flow

FIG. 11 illustrates an example of a timing chart of the input delay setting process.

The first game device (host) performs the following process at a predetermined timing 280 (e.g., after the opponent has been determined before the game starts).

The first game device transmits and receives the setting information (see 282). The term "setting information" refers to the input operation definition information of each game device described with reference to FIGS. 10A and 10B and the display delay time information of each game device described with reference to FIG. 7.

The first game device determines the delay time using the method described with reference to FIG. 9, for example (see 284). The first game device sets the input delay time of the first game device and the input delay time of the second game device based on the determined delay time using the method described with reference to FIG. 9, for example (see 286). The first game device then transmits the input delay time of the second game device (see 288). Specifically, the first game device transmits the input delay time of the second game device, and the second game device receives the input delay time of the second game device.

The first game device and the second game device start game calculations while the game start timing 250 of the first game device is synchronized with the game start timing 250' of the second game device. Each game device receives input information and generates game data based on the input information in the frame 250 or 250'. Each game device transmits the game data to the other game device while storing the game data in the first buffer. When the communication delay time is T1, the game data transmitted from the other game device in the frame 250 or 250' is received in a frame 260 or 260', and stored in the second buffer. When the input delay time is T2, the game data generated in the frame 250 or 250' is extracted from the first buffer and the second buffer in a frame 270 or 270' after the input delay time has elapsed, and game calculations are then performed.

The invention is not limited to the above-described embodiments, and various modifications can be made.

The invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

The above embodiments have been described taking an example in which the game data is transmitted every frame. Note that the invention is not limited thereto. For example, a packet including the game data corresponding to n frames may be transmitted every n frames.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

2. The information storage medium as defined in claim 1, wherein the first data generation section generates the first data associated with the identification number corresponding to a scheduled calculation frame that reflects the input delay time, based on the input delay time and a frame in which the input information from the operation section has been received; and wherein the synchronization control section extracts data for which the scheduled calculation frame has been reached based on the identification number.

3. The information storage medium as defined in claim 1, wherein the input delay time setting section determines a difference in display delay time between the computer terminal and the other computer terminal based on display delay time information, sets a first input delay time and a second input delay time so that the input delay time of one of the computer terminal and the other computer terminal having a shorter display delay time is longer than the input delay time of the other of the computer terminal and the other computer terminal by the difference in display delay time, and transmits second input delay time information to the other computer terminal through the network.

4. A non-transitory computer-readable information storage medium storing a program that controls a computer terminal that transmits data to or receives data from another computer terminal through a network and performs calculations based on data input from an operation section and data received from the other computer terminal through the network, the program causing a computer to function as:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area; and an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control section extracting data having an elapsed time after input of the data that has exceeded the input delay time, based on the first input delay time and the identification numbers associated with the first data stored in the first storage area and the second data stored in the second storage area.

5. The information storage medium as defined in claim 3, wherein the first data generation section generates the first data associated with the identification number corresponding to a scheduled calculation frame that reflects the first input delay time, based on the first input delay time and a frame in which the input information from the operation section has been received;

wherein the first data generation section generates transmission data to be transmitted to the other computer terminal based on the second input delay time and a frame in which the input information from the operation section has been received, the transmission data being associated with the identification number corresponding to a scheduled calculation frame that reflects the second input delay time;

wherein the data communication control section transmits the generated transmission data to the other computer terminal through the network at predetermined intervals, and receives the second data transmitted from the other computer terminal through the network; and wherein the synchronization control section stores the first data in the first storage area based on the identification number associated with the first data, and stores the second data in the second storage area based on the identification number associated with the second data.

6. The information storage medium as defined in claim 4, wherein the first data generation section generates the first data associated with the identification number corresponding to a scheduled calculation frame that reflects the first input delay time, based on the first input delay time and a frame in which the input information from the operation section has been received;

wherein the first data generation section generates transmission data to be transmitted to the other computer terminal based on the second input delay time and a frame in which the input information from the operation section has been received, the transmission data being associated with the identification number corresponding to a scheduled calculation frame that reflects the second input delay time;

wherein the data communication control section transmits the generated transmission data to the other computer terminal through the network at predetermined intervals, and receives the second data transmitted from the other computer terminal through the network; and wherein the synchronization control section stores the first data in the first storage area based on the identification number associated with the first data, and stores the second data in the second storage area based on the identification number associated with the second data.

7. The information storage medium as defined in claim 3, the program causing the computer to further function as:

a display delay time setting section that sets first display delay time information based on the input information from the operation section; and a display delay time information communication control section that transmits the set first display delay time information to the other computer terminal through the network, and receives second display delay time information about the other computer terminal transmitted from the other computer terminal through the network, wherein the input delay time setting section calculates the difference in display delay time between the computer terminal and the other computer terminal based on the set first display delay time information and the received second display delay time information.

8. The information storage medium as defined in claim 4, the program causing the computer to further function as:

a display delay time setting section that sets first display delay time information based on the input information from the operation section; and a display delay time information communication control section that transmits the set first display delay time information to the other computer terminal through the network, and receives second display delay time information about the other computer terminal transmitted from the other computer terminal through the network, wherein the input delay time setting section calculates the difference in display delay time between the computer terminal and the other computer terminal based on the set first display delay time information and the received second display delay time information.

9. The information storage medium as defined in claim 1, wherein the communication delay time determination section sequentially performs the test communication that transmits and receives a packet between the computer terminal and the other computer terminal a plurality of times, and determines the communication delay time based on the results of the test communication.

10. The information storage medium as defined in claim 9, wherein the communication delay time determination section determines the communication delay time based on a test communication state within a predetermined period after starting the test communication.

11. The information storage medium as defined in claim 1, the program causing the computer to further function as:

an input operation definition information generation section that receives a setting input that sets the relationship between an input operation from the operation section and movement information used in common in the computer terminal and the other computer terminal, and generates input operation definition information that defines the relationship between the input operation from the operation section and the movement information based on the setting input, wherein the first data generation section converts information indicated by the input operation corresponding to the input information into the movement information based on the input operation definition information, and generates data that includes the movement information.

12. The information storage medium as defined in claim 4, the program causing the computer to further function as:

an input operation definition information generation section that receives a setting input that sets the relationship between an input operation from the operation section and movement information used in common in the computer terminal and the other computer terminal, and generates input operation definition information that defines the relationship between the input operation from the operation section and the movement information based on the setting input, wherein the first data generation section converts information indicated by the input operation corresponding to the input information into the movement information based on the input operation definition information, and generates data that includes the movement information.

13. The information storage medium as defined in claim 1, the program causing the computer to further function as:

an input operation definition information generation section that receives a setting input that sets the relationship between an input operation from the operation section and movement information used in common in the computer terminal and the other computer terminal, and generates first input operation definition information that defines the relationship between the input operation from the operation section and the movement information based on the setting input; and an input operation definition information communication control section that transmits the generated first input operation definition information to the other computer terminal through the network, and receives second input operation definition information transmitted from the other computer terminal through the network, wherein the first data generation section generates the first data that includes information indicated by the input operation from the operation section corresponding to the input information;

wherein the calculation section converts the information indicated by the input operation included in the first data extracted from the first storage area into first movement information, based on the first input operation definition information;

wherein the calculation section converts the information indicated by the input operation included in the second data extracted from the second storage area into second movement information based on the second input operation definition information; and wherein the calculation section performs calculations every frame based on the first movement information and the second movement information.

14. The information storage medium as defined in claim 4, the program causing the computer to further function as:

an input operation definition information generation section that receives a setting input that sets the relationship between an input operation from the operation section and movement information used in common in the computer terminal and the other computer terminal, and generates first input operation definition information that defines the relationship between the input operation from the operation section and the movement information based on the setting input; and an input operation definition information communication control section that transmits the generated first input operation definition information to the other computer terminal through the network, and receives second input operation definition information transmitted from the other computer terminal through the network, wherein the first data generation section generates the first data that includes information indicated by the input operation from the operation section corresponding to the input information;

wherein the calculation section converts the information indicated by the input operation included in the first data extracted from the first storage area into first movement information, based on the first input operation definition information;

wherein the calculation section converts the information indicated by the input operation included in the second data extracted from the second storage area into second movement information based on the second input operation definition information; and wherein the calculation section performs calculations every frame based on the first movement information and the second movement information.

15. The information storage medium as defined in claim 1, wherein the game calculation section stops calculations and displays the same image as an image in a preceding frame when the second data to be extracted has not been received from the other computer terminal.

16. The information storage medium as defined in claim 4, wherein the game calculation section stops calculations and displays the same image as an image in a preceding frame when the second data to be extracted has not been received from the other computer terminal.

17. The information storage medium as defined in claim 1, wherein the data communication control section transmits data to the other computer terminal according to a first protocol whereby data that has been lost during transmission is not retransmitted, and receives the second data transmitted from the other computer terminal according to the first protocol;

wherein the data communication control section transmits a data retransmission request while adding the identification number associated with the second data to be extracted as retransmission data identification information when the second data to be extracted has not been received; and wherein the data communication control section transmits data associated with the identification number corresponding to the added retransmission data identification information to the other computer terminal when the data retransmission request has been received from the other computer terminal.

18. The information storage medium as defined in claim 4, wherein the data communication control section transmits data to the other computer terminal according to a first protocol whereby data that has been lost during transmission is not retransmitted, and receives the second data transmitted from the other computer terminal according to the first protocol;

wherein the data communication control section transmits a data retransmission request while adding the identification number associated with the second data to be extracted as retransmission data identification information when the second data to be extracted has not been received; and wherein the data communication control section transmits data associated with the identification number corresponding to the added retransmission data identification information to the other computer terminal when the data retransmission request has been received from the other computer terminal.

19. The information storage medium as defined in claim 1, wherein the data communication control section transmits n packets to the other computer terminal according to a first protocol whereby data that has been lost during transmission is not retransmitted, transmits a packet including data in the n packets to the other computer terminal according to a second protocol whereby data that has been lost during transmission is retransmitted each time the n packets is transmitted according to the first protocol, and receives packets transmitted from the other computer terminal according to the first protocol and the second protocol; and wherein, when a packet corresponding to data in a given frame has not been received from the other computer terminal according to the first protocol, the synchronization control section stores the data in the given frame included in a packet transmitted from the other computer terminal according to the second protocol in the second storage area.

20. The information storage medium as defined in claim 4, wherein the data communication control section transmits n packets to the other computer terminal according to a first protocol whereby data that has been lost during transmission is not retransmitted, transmits a packet including data in the n packets to the other computer terminal according to a second protocol whereby data that has been lost during transmission is retransmitted each time the n packets is transmitted according to the first protocol, and receives packets transmitted from the other computer terminal according to the first protocol and the second protocol; and wherein, when a packet corresponding to data in a given frame has not been received from the other computer terminal according to the first protocol, the synchronization control section stores the data in the given frame included in a packet transmitted from the other computer terminal according to the second protocol in the second storage area.

21. A synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area;

a communication delay time determination step that performs a test communication between the computer terminal and the other computer terminal, and determines a communication delay time based on the result of the test communication; and an input delay time setting step that sets an input delay time and transmits the input delay time to the other computer terminal through the network, the input delay time being equal to or longer than the determined communication delay time, the synchronization control step extracting data having an elapsed time after input of the data that has exceeded the input delay time, based on the input delay time and the identification numbers associated with the first data stored in the first storage area and the second data stored in the second storage area.

22. A synchronization control method implemented by a computer terminal that transmits data to and receives data from another computer terminal through a network and performs calculations based on data input from an operation section and data received from the other computer terminal through the network, the method comprising:

a first data generation step that generates first data every frame based on input information from the operation section, an identification number corresponding to each frame being assigned to the first data;

a data communication control step that transmits the generated first data to the other computer terminal through the network at predetermined intervals, and receives second data transmitted from the other computer terminal through the network;

a synchronization control step that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation step that performs calculations every frame based on the first data extracted from the first storage area and the second data extracted from the second storage area; and an input delay time setting step that calculates a difference in display delay time between the computer terminal and the other computer terminal based on display delay time information about the computer terminal and the other computer terminal, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network, the synchronization control step extracting data having an elapsed time after input of the data that has exceeded the input delay time, based on the first input delay time and the identification numbers associated with the first data stored in the first storage area and the second data stored in the second storage area.

23. A computer terminal that transmits data to or receives data from another computer terminal through a network and performs calculations based on data input from an operation section and data received from the other computer terminal through the network, the computer terminal comprising:

a first data generation section that generates first data every frame based on input information from the operation section, an identification number corresponding to each frame being associated with the first data;

a data communication control section that transmits the generated first data to the other computer terminal through the network at predetermined intervals, and receives second data transmitted from the other computer terminal through the network;

a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;

a calculation section that performs calculations every frame based on the first data extracted from the first storage area and the second data extracted from the second storage area;

a communication delay time determination section that performs a test communication between the computer terminal and the other computer terminal, and determines a communication delay time based on the result of the test communication; and an input delay time setting section that sets an input delay time and transmits the input delay time to the other computer terminal through the network, the input delay time being equal to or longer than the determined communication delay time, the synchronization control section extracting data having an elapsed time after input of the data that has exceeded the input delay time, based on the input delay time and the identification numbers associated with the first data stored in the first storage area and the second data stored in the second storage area.

24. A computer terminal that transmits data to or receives data from another computer terminal through a network and performs calculations based on data input from an operation section and data received from the other computer terminal through the network, the computer terminal comprising:
  a first data generation section that generates first data every frame based on input information from the operation section, an identification number corresponding to each frame being associated with the first data;
  a data communication control section that transmits the generated first data to the other computer terminal through the network at predetermined intervals, and receives second data transmitted from the other computer terminal through the network;
  a synchronization control section that stores the first data in a first storage area based on the identification number associated with the first data, stores the second data in a second storage area based on an identification number associated with the second data, and extracts the first data stored in the first storage area and the second data stored in the second storage area in synchronization based on the identification numbers associated with the first data and the second data;
  a calculation section that performs calculations every frame based on the first data extracted from the first storage area and the second data extracted from the second storage area; and
  an input delay time setting section that determines a difference in display delay time between the computer terminal and the other computer terminal based on display delay time information, sets a first input delay time and a second input delay time so that the input delay time of one of the computer terminal and the other computer terminal having a shorter display delay is longer than the input delay time of the other of the computer terminal and the other computer terminal by the difference in display delay time, and transmits second input delay time information to the other computer terminal through the network,
  the synchronization control section extracting data having an elapsed time after input of the data that has exceeded the input delay time, based on the first input delay time and the identification numbers associated with the first data stored in the first storage area and the second data stored in the second storage area.

* * * * *